US012607255B2

(12) United States Patent (10) Patent No.: US 12,607,255 B2
Miyazaki et al. (45) Date of Patent: Apr. 21, 2026

(54) METHOD FOR PRODUCING WORM WHEEL, AND WORM WHEEL

(71) Applicant: NSK LTD., Tokyo (JP)

(72) Inventors: Atsushi Miyazaki, Maebashi (JP);
Tomohiro Arai, Maebashi (JP);
Haruhiko Kiyota, Maebashi (JP);
Takeshi Yamamoto, Maebashi (JP)

(73) Assignee: NSK LTD., Tokyo (JP)

( * ) Notice: Subject to any disclaimer, the term of this
patent is extended or adjusted under 35
U.S.C. 154(b) by 478 days.

(21) Appl. No.: 18/014,611

(22) PCT Filed: May 14, 2021

(86) PCT No.: PCT/JP2021/018514
§ 371 (c)(1),
(2) Date: Jan. 5, 2023

(87) PCT Pub. No.: WO2022/009523
PCT Pub. Date: Jan. 13, 2022

(65) Prior Publication Data
US 2023/0272848 A1 Aug. 31, 2023

(30) Foreign Application Priority Data

Jul. 7, 2020 (JP) ................................. 2020-116999
Dec. 22, 2020 (JP) ................................. 2020-211963

(51) Int. Cl.
*F16H 55/22* (2006.01)
*B29C 45/14* (2006.01)
(Continued)

(52) U.S. Cl.
CPC ....... *F16H 55/22* (2013.01); *B29C 45/14336*
(2013.01); *B29C 45/2708* (2013.01);
(Continued)

(58) Field of Classification Search
CPC .......... B29C 45/14336; B29C 45/2708; B29C
45/14598
See application file for complete search history.

(56) References Cited

U.S. PATENT DOCUMENTS 3,446,407 A * 5/1969 Dawson ................ B29C 45/382
225/93
RE45,516 E 5/2015 Suzuki
(Continued)

FOREIGN PATENT DOCUMENTS

CN 101251180 A 8/2008
CN 101263644 A 9/2008
(Continued)

OTHER PUBLICATIONS

Machine translation of JP2018204660A, 12 pages. (Year: 2025).*
(Continued)

*Primary Examiner* — Emmanuel S Luk
(74) *Attorney, Agent, or Firm* — Sughrue Mion, PLLC

(57) ABSTRACT

A method for manufacturing a worm wheel including an
inner wheel element including a side plate portion and a
tubular eave portion, and an outer wheel element including
a wheel tooth portion on an outer circumferential surface
thereof, and coupled and fixed to the inner wheel element in
a manner of covering a radially outer portion of the side
plate portion and the eave portion, the method includes:
molding the outer wheel element by disposing a mold
around a radially outer portion of the inner wheel element,
and feeding the molten synthetic resin from an annular or
arc-shaped injection gate toward a pocket portion that is
continuous over an entire circumference of a cavity present
between an inner surface of the mold and a surface of the
inner wheel element and that is present on a radially inner
side of the eave portion.

14 Claims, 27 Drawing Sheets

(51) Int. Cl.

| | | |
|---|---|---|
| *B29C 45/27* | (2006.01) | |
| *B29L 15/00* | (2006.01) | |
| *B62D 5/04* | (2006.01) | |
| *F16H 1/16* | (2006.01) | |
| *F16H 55/06* | (2006.01) | |

(52) U.S. Cl.

CPC ....... *B29L 2015/003* (2013.01); *B62D 5/0454* (2013.01); *F16H 1/16* (2013.01); *F16H 2055/065* (2013.01)

(56)        References Cited

U.S. PATENT DOCUMENTS

| | | | |
|---|---|---|---|
| 2002/0178853 A1 | 12/2002 | Konishi et al. | |
| 2004/0185139 A1* | 9/2004 | Adams | B29C 45/2708 |
| | | | 425/556 |
| 2009/0007711 A1 | 1/2009 | Suzuki | |
| 2009/0284866 A1 | 11/2009 | Ito et al. | |
| 2013/0228028 A1* | 9/2013 | Kim | B29C 45/1671 |
| | | | 264/279 |
| 2018/0017149 A1 | 1/2018 | Takeuchi et al. | |
| 2020/0255057 A1 | 8/2020 | Ishii | |
| 2021/0088112 A1 | 3/2021 | Kiyota et al. | |
| 2021/0162639 A1 | 6/2021 | Fujinaka et al. | |

FOREIGN PATENT DOCUMENTS

| | | | | |
|---|---|---|---|---|
| CN | 111247050 A | 6/2020 | | |
| EP | 1586795 A1 * | 10/2005 | ............. | F16H 55/22 |
| EP | 3 396 209 A1 | 10/2018 | | |
| JP | 2004-276638 A | 10/2004 | | |
| JP | 3688963 B2 * | 8/2005 | | |
| JP | 2005-305779 A | 11/2005 | | |
| JP | 2017160920 A * | 9/2017 | | |
| JP | 2018-9656 A | 1/2018 | | |
| JP | 2018-9657 A | 1/2018 | | |
| JP | 2018-204660 A | 12/2018 | | |
| JP | 2020-41570 A | 3/2020 | | |
| WO | WO-2004065824 A1 * | 8/2004 | ............. | F16H 55/22 |
| WO | 2017/135141 A1 | 8/2017 | | |

OTHER PUBLICATIONS

Office Action issued May 16, 2023 by the Japanese Patent Office in corresponding Japanese Patent Application No. 2022-534926.

Office Action issued May 16, 2024 by the German Patent Office in German Patent Application No. 112021003624.6.

Search Report (PCT/ISA/210) issued Jul. 13, 2021 by the International Searching Authority for International Application Patent No. PCT/JP2021/018514.

Written Opinion (PCT/ISA/237) issued Jul. 13, 2021 by the International Searching Authority for International Application Patent No. PCT/JP2021/018514.

Office Action issued Mar. 2, 2026 by the China National Intellectual Property Administration in Chinese Patent Application No. 202180048436.6.

* cited by examiner

ONE AXIAL SIDE

OTHER AXIAL SIDE

ONE AXIAL SIDE ←     OTHER AXIAL SIDE →

ONE AXIAL SIDE

OTHER AXIAL SIDE

ONE AXIAL SIDE

OTHER AXIAL SIDE

ONE AXIAL SIDE

OTHER AXIAL SIDE

ONE AXIAL SIDE

OTHER AXIAL SIDE

ONE AXIAL SIDE

OTHER AXIAL SIDE

ONE AXIAL SIDE

OTHER AXIAL SIDE

ONE AXIAL SIDE

OTHER AXIAL SIDE

ONE AXIAL SIDE

OTHER AXIAL SIDE

ONE AXIAL SIDE

OTHER AXIAL SIDE

ONE AXIAL SIDE

OTHER AXIAL SIDE

ONE AXIAL SIDE

OTHER AXIAL SIDE

ONE AXIAL SIDE

OTHER AXIAL SIDE

ONE AXIAL SIDE

OTHER AXIAL SIDE

ONE AXIAL SIDE

OTHER AXIAL SIDE

METHOD FOR PRODUCING WORM WHEEL, AND WORM WHEEL

CROSS REFERENCE TO RELATED APPLICATIONS

This application is a National Stage of International Application No. PCT/JP2021/018514 filed on May 14, 2021 claiming priority from Japanese Patent Application No. 2020-116999 filed on Jul. 7, 2020 and Japanese Patent Application No. 2020-211963 filed on Dec. 22, 2020, the disclosures of which are incorporated herein in their entirety by reference.

TECHNICAL FIELD

The present invention relates to a method for manufacturing a worm wheel constituting a worm reduction gear, and the worm wheel.

BACKGROUND ART

In a steering device for an automobile, when a driver operates a steering wheel, that is, rotates the steering wheel, the rotation of the steering wheel is transmitted to an input shaft of a steering gear unit by a steering shaft or an intermediate shaft. When a rack shaft of the steering gear unit is displaced in a width direction of a vehicle due to the rotation of the input shaft, a pair of tie rods are pushed and pulled, and a steering angle is applied to a steered wheel.

JP2004-276638A (Patent Literature 1) discloses an electric power steering device that uses an electric motor as an auxiliary power source to reduce a force required for a driver to operate a steering wheel in order to apply a steering angle to a steered wheel. In the electric power steering device, after torque of the electric motor is increased by a worm reduction gear, the torque is applied to a rotating shaft that rotates in accordance with rotation of the steering wheel, such as a steering shaft or an input shaft of a steering gear unit, or a linear motion shaft such as a rack shaft or a screw shaft of the steering gear unit.

The worm reduction gear that constitutes the electric power steering device includes a worm that is an input-side gear rotationally driven by the electric motor, and a worm wheel that is an output-side gear. The worm includes a worm tooth portion on an outer circumferential surface of an axially intermediate portion thereof. The worm wheel includes, on an outer circumferential surface thereof, a wheel tooth portion that meshes with the worm tooth portion.

In such a worm reduction gear, for the purpose of reducing gear rattle generated at a meshing portion between the worm tooth portion and the wheel tooth portion during an operation of the steering wheel or traveling on a rough road, reducing weight, reducing cost, and the like, the worm wheel may include a radially inner portion that is externally fitted and fixed to the rotating shaft and made of metal, and a radially outer portion that meshes with the worm tooth portion and is made of a synthetic resin.

FIG. 26 shows a worm wheel described in JP2018-009656A (Patent Literature 2) as an example of a worm wheel in which a radially inner portion is made of metal and a radially outer portion is made of a synthetic resin. In the following description, with respect to a worm wheel 100, one axial side is a left side in FIG. 26, and the other axial side is a right side in FIG. 26.

The worm wheel 100 includes an inner wheel element 101 and an outer wheel element 102.

The inner wheel element 101 includes a metal portion 103 and a resin portion 104. The metal portion 103 is formed of metal in a cylindrical shape, and is externally fitted and fixed to a rotating shaft such as a steering shaft. The resin portion 104 is formed of a synthetic resin in an annular shape, and is coupled and fixed to the metal portion 103 in a manner of covering an outer circumferential surface of the metal portion 103.

The resin portion 104 includes a radially inner portion 105 and a radially outer portion 106 having a width dimension in an axial direction smaller than that of the radially inner portion 105. The radially outer portion 106 includes first recesses 107a that are open only in a side surface on the one axial side, at a plurality of positions at equal intervals in a circumferential direction on a one axial side portion. In the resin portion 104, a portion between the first recesses 107a adjacent to each other in a circumferential direction includes a first reinforcing rib 108a. The radially outer portion 106 includes second recesses 107b that are open only in a side surface on the other axial side at a plurality of positions at equal intervals in the circumferential direction on the other axial side portion, specifically, at a plurality of locations that are in phase with the first recesses 107a in the circumferential direction. In the resin portion 104, a portion between the second recesses 107b adjacent to each other in the circumferential direction includes a second reinforcing rib 108b.

The outer wheel element 102 is formed by injection molding of the synthetic resin, includes a wheel tooth portion 109 on an outer circumferential surface thereof, and is coupled and fixed to the inner wheel element 101 in a manner of covering the radially outer portion 106 of the resin portion 104 constituting the inner wheel element 101. The outer wheel element 102 includes a first engagement portion 110a that enters an inside of the first recess 107a and engages with the first recess 107a, and a second engagement portion 110b that enters an inside of the second recess 107b and engages with the second recess 107b. Coupling strength of the outer wheel element 102 with respect to the inner wheel element 101 is sufficiently ensured by engagement between the first recess 107a and the first engagement portion 110a and engagement between the second recess 107b and the second engagement portion 110b.

When the worm wheel 100 is manufactured, the inner wheel element 101 is formed by coupling the resin portion 104 to the metal portion 103, and then the outer wheel element 102 is formed by the injection molding, and at the same time, the outer wheel element 102 is coupled to the inner wheel element 101.

When the outer wheel element 102 is formed by the injection molding, as shown in FIG. 27, the inner wheel element 101 is set in a mold 111 formed by combining a plurality of mold elements. That is, by disposing the mold 111 around the inner wheel element 101, an annular cavity 112, which is a molding space for the outer wheel element 102, is formed between an inner surface of the mold 111 and a surface of the inner wheel element 101. The mold 111 includes an annular runner 113 centered on a central axis of the inner wheel element 101 inside a portion disposed on the one axial side of the inner wheel element 101. The runner 113 includes an annular injection gate 114 at an end portion (downstream end portion) on the other axial side. The injection gate 114 opens to the inner surface of the mold 111, and axially faces the plurality of first recesses 107*a* and first reinforcing ribs 108*a* in the radially outer portion 106 of the resin portion 104.

Further, in this state, the molten synthetic resin (hereinafter, sometimes referred to as "molten resin" as appropriate) sent through the runner 113 is sent from the injection gate 114 to the cavity 112, and is cooled and solidified in the cavity 112. Accordingly, the outer wheel element 102 is coupled to the inner wheel element 101 at the same time as the outer wheel element 102 is molded. Thereafter, the mold 111 is opened to open the cavity 112, and the worm wheel 100 is taken out.

CITATION LIST

Patent Literature

Patent Literature 1: JP-A-2004-276638
Patent Literature 2: JP-A-2018-009656

SUMMARY OF INVENTION

Technical Problem

In a method for manufacturing the worm wheel 100 described above, the molten resin fed from the injection gate 114 into the cavity 112 flows from a portion present on the one axial side of the radially outer portion 106 of the resin portion 104 toward a portion present on the other axial side of the radially outer portion 106 via a portion present on a radially outer side of the radially outer portion 106.

However, in a portion present on the one axial side of the radially outer portion 106 in the cavity 112, the first reinforcing rib 108*a* is present between the first recesses 107*a* that are adjacent to each other in the circumferential direction. Therefore, the molten resin fed from the injection gate 114 into the cavity 112 passes through the one axial side of the first reinforcing rib 108*a* at a circumferential position where the first reinforcing rib 108*a* is present, and is fed into the portion present on the radially outer side of the radially outer portion 106, whereas at a circumferential position where the first recess 107*a* is present, the molten resin is first fed into the first recess 107*a* to fill the entire first recess 107*a*, and then fed into the portion present on the radially outer side of the radially outer portion 106. Here, an outer circumferential portion of the portion present on the radially outer side of the radially outer portion 106 in the cavity 112 includes a wheel tooth portion molding portion 115 that molds a surface of the wheel tooth portion 109 on the inner surface of the mold 111.

That is, in the method for manufacturing the worm wheel 100 described above, timings at which the molten resin reaches the wheel tooth portion molding portion 115 differ at the circumferential position where the first reinforcing rib 108*a* is present and the circumferential position where the first recess 107*a* is present. Specifically, at the circumferential position where the first recess 107*a* is present, the timing at which the molten resin reaches the wheel tooth portion molding portion 115 is later than at the circumferential position where the first reinforcing rib 108*a* is present. Therefore, at the circumferential position where the first recesses 107*a* is present, a timing of cooling the molten resin in the wheel tooth portion molding portion 115 is also later than at the circumferential position where the first reinforcing rib 108*a* is present. As a result, shape accuracy of the wheel tooth portion 109 deteriorates, and abnormal noise or vibration may occur at a meshing portion between the wheel tooth portion 109 and a worm tooth portion during use.

In the method for manufacturing the worm wheel 100 described above, in a case where the runner 113 is a hot runner and the injection gate 114 is an open gate, the molten resin remaining in the vicinity of the injection gate 114 may come into contact with air and be cooled during a period from an end of the injection molding of the outer wheel element 102 to injection molding of the next outer wheel element 102, and a cold slug (mass of the cooled synthetic resin) may be formed. Further, when the next outer wheel element 102 is injection molded without removing the cold slug, the cold slug is fed from the injection gate 114 into the cavity 112 together with the molten resin. In particular, in the method for manufacturing the worm wheel 100 described in JP2018-009656A, a part of the molten resin fed from the injection gate 114 into the cavity 112 flows to the wheel tooth portion molding portion 115 through the one axial side of the first reinforcing rib 108*a* without being filled in the first recess 107*a*. Therefore, the cold slug may flow to the wheel tooth portion molding portion 115 together with such a molten resin. Further, when such a cold slug comes into contact with the wheel tooth portion molding portion 115, the cold slug is rapidly cooled and solidified. Since an amount of shrinkage of the cold slug due to cooling is smaller than that of the surrounding molten resin, the shape accuracy of the wheel tooth portion 109 may deteriorate, and the abnormal noise or vibration may occur at the meshing portion between the wheel tooth portion 109 and the worm tooth portion during use. When the cold slug is present in the wheel tooth portion 109, a stress is likely to concentrate around the cold slug, and damage such as a crack is likely to occur from the surrounding portion as a starting point. Therefore, ensuring durability may be difficult.

In view of the above circumstances, an object of the present invention is to provide a method for manufacturing a worn wheel that can easily ensure shape accuracy and durability of wheel teeth.

Solution to Problem

A worm wheel to be manufactured by a method for manufacturing the worm wheel according to one aspect of the present invention includes: an inner wheel element including a side plate portion having a hollow circular plate shape and a tubular eave portion extending from a radially outer end portion of the side plate portion toward one axial side; and an outer wheel element made of a synthetic resin, including a wheel tooth portion on an outer circumferential surface thereof, and coupled and fixed to the inner wheel element in a manner of covering a radially outer portion of the side plate portion and the eave portion.

The method for manufacturing a worm wheel according to one aspect of the present invention includes: a step of molding the outer wheel element by disposing a mold around a radially outer portion of the inner wheel element, and feeding the molten synthetic resin from an annular or arc-shaped injection gate toward a pocket portion that is continuous over an entire circumference of a cavity present between an inner surface of the mold and a surface of the inner wheel element and that is present on a radially inner side of the cave portion.

In the method for manufacturing a worm wheel according to one aspect of the present invention, the injection gate faces an inner circumferential surface of the eave portion.

In the method for manufacturing a worm wheel according to one aspect of the present invention, the inner wheel element includes an engagement groove recessed radially outward over an entire circumference of the inner circumferential surface of the eave portion, and the injection gate faces the engagement groove in the inner circumferential surface of the eave portion.

In the method for manufacturing a worm wheel according to one aspect of the present invention, the injection gate faces a side surface of the side plate portion on the one axial side.

In the method for manufacturing a worm wheel according to one aspect of the present invention, the mold includes a stepped cylindrical surface portion including a large diameter surface portion facing an inner circumferential surface of an one axial side portion of the eave portion, a small diameter surface portion facing an inner circumferential surface of the other axial side portion of the eave portion, and a connection surface portion connecting the large diameter surface portion and the small diameter surface portion.

In the method for manufacturing a worm wheel according to one aspect of the present invention, the injection gate is opened to the connection surface portion.

In the method for manufacturing a worm wheel according to one aspect of the present invention, the mold includes a side surface molding portion bent radially outward from an end portion of the large diameter surface portion on the one axial side, and the injection gate is opened to the side surface molding portion.

In the method for manufacturing a worm wheel according to one aspect of the present invention, the mold includes a hot runner including the injection gate at a downstream end portion, and the injection gate is an open gate.

In the method for manufacturing a worm wheel according to one aspect of the present invention, the inner wheel element includes a through hole penetrating in an axial direction in a portion of the side plate portion located radially inward of the outer wheel element.

In the method for manufacturing a worm wheel according to one aspect of the present invention, when the mold is opened after the step of molding the outer wheel element, a separated piece remaining on a side of the outer wheel element and formed by a part of the synthetic resin that remains inside a runner and is cooled and solidified, remains at a position where the injection gate of the outer wheel element is opened without being processed.

A worm wheel according to the present invention includes: an inner wheel element including a side plate portion having a hollow circular plate shape and a tubular eave portion extending from a radially outer end portion of the side plate portion toward one axial side; and an outer wheel element made of a synthetic resin, including a wheel tooth portion on an outer circumferential surface thereof, and coupled and fixed to the inner wheel element in a manner of covering a radially outer portion of the side plate portion and the eave portion.

In particular, in the worm wheel of the present invention, an annular or arc-shaped injection gate mark is formed on a surface of the outer wheel element, and a cold slug is held only by a first restriction portion that is continuous over an entire circumference of the outer wheel element and present on a radially inner side of the eave portion.

In the worm wheel according to one aspect of the present invention, a separated piece is provided at a position of the injection gate mark of the outer wheel element.

6

Advantageous Effects of Invention

According to a method for manufacturing a worm wheel of one aspect of the present invention, it is easy to ensure shape accuracy and durability of wheel teeth of the worm wheel.

BRIEF DESCRIPTION OF DRAWINGS

FIGS. 17A and 17B show a sixth embodiment of the present invention, in which FIG. 17A is a view of an inner wheel element as observed from one axial side, and FIG. 17B is a cross-sectional view taken along a line E-E in FIG. 17A.

DESCRIPTION OF EMBODIMENTS

First Embodiment

A first embodiment of the present invention will be described with reference to FIGS. 1 to 11.

Figure 1:
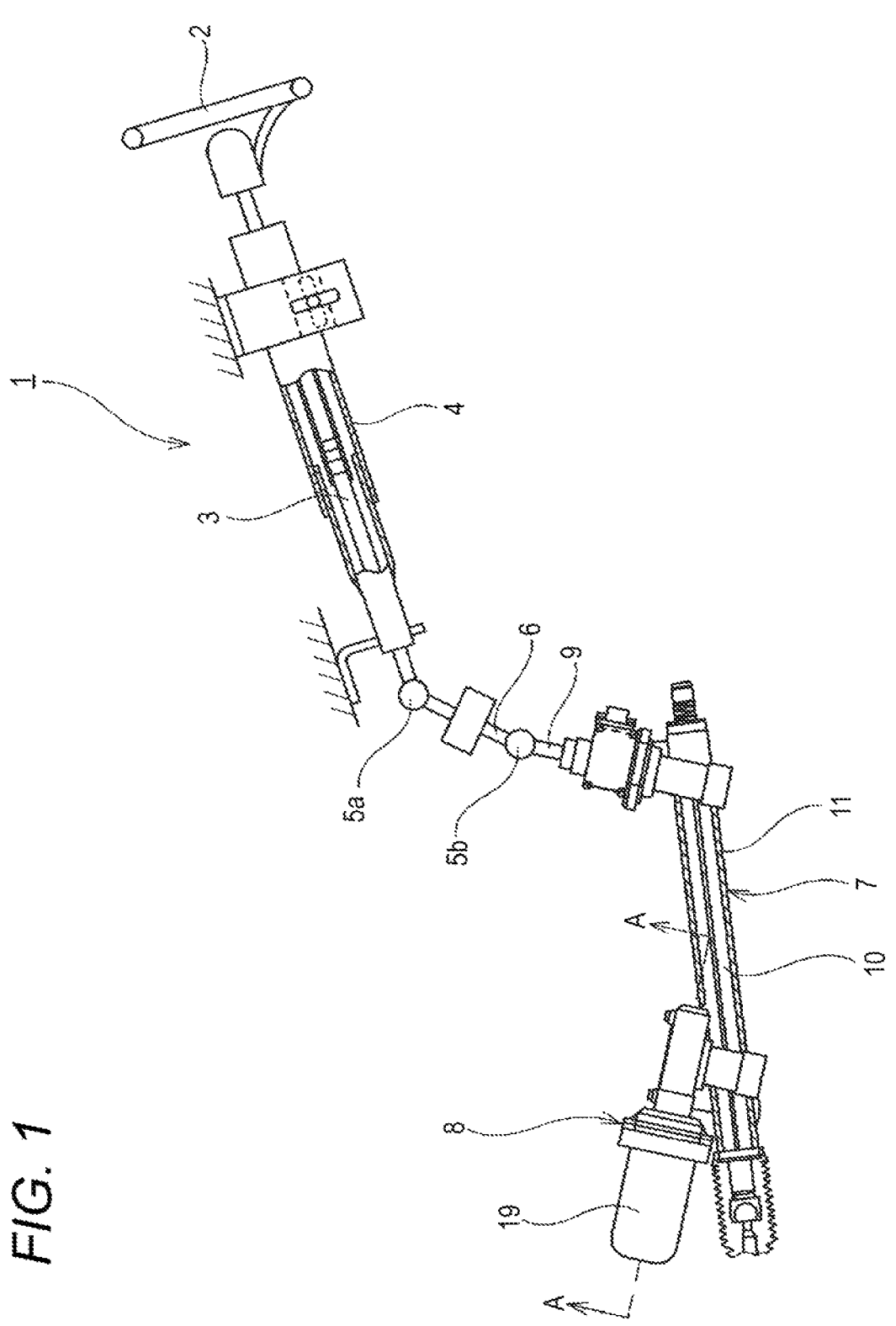
FIG. 1 is a partially cut side view showing an electric power steering device including a worm wheel according to a first embodiment of the present invention.
Figure 2:
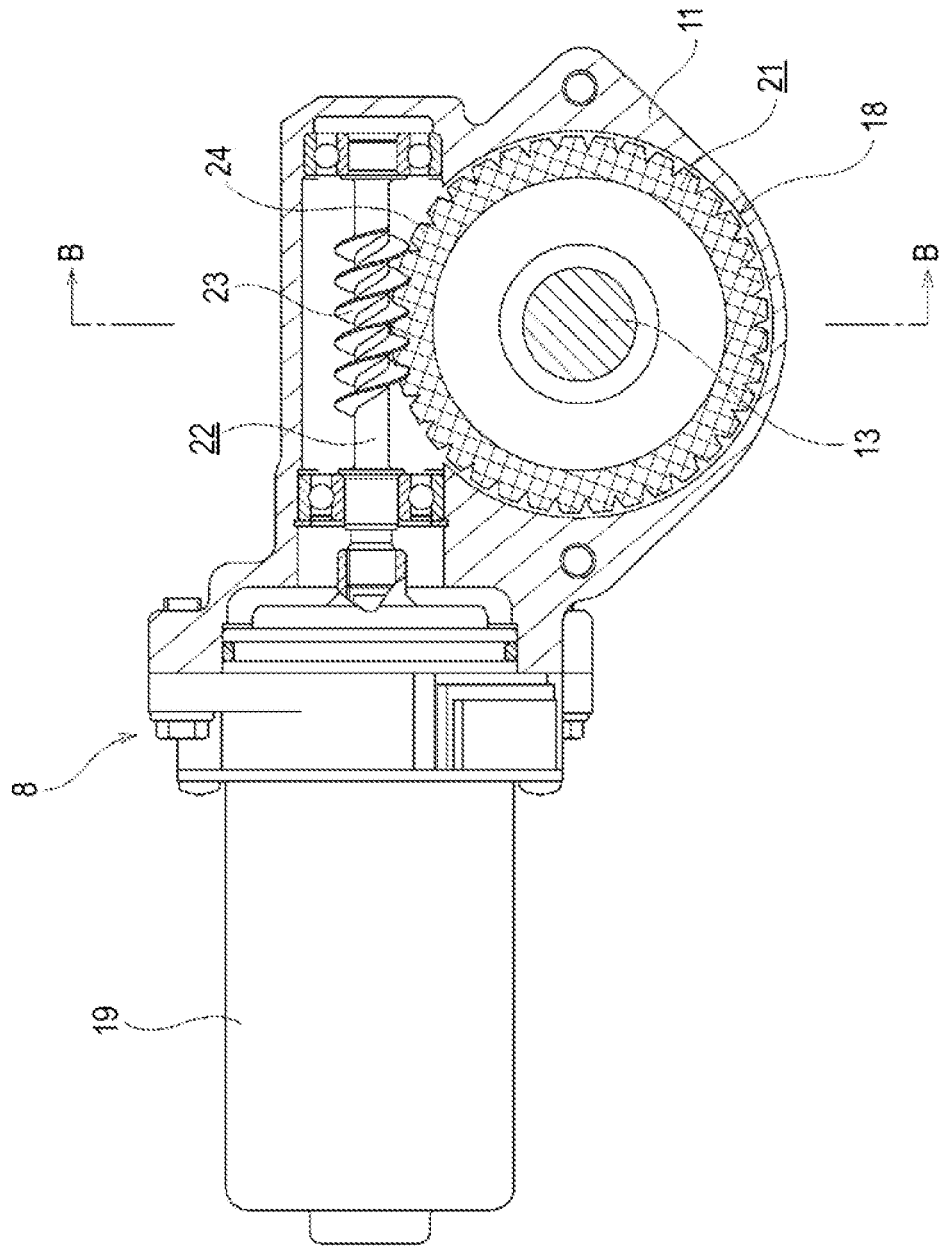
FIG. 2 is a cross-sectional view taken along a line A-A in FIG. 1.
Figure 3:
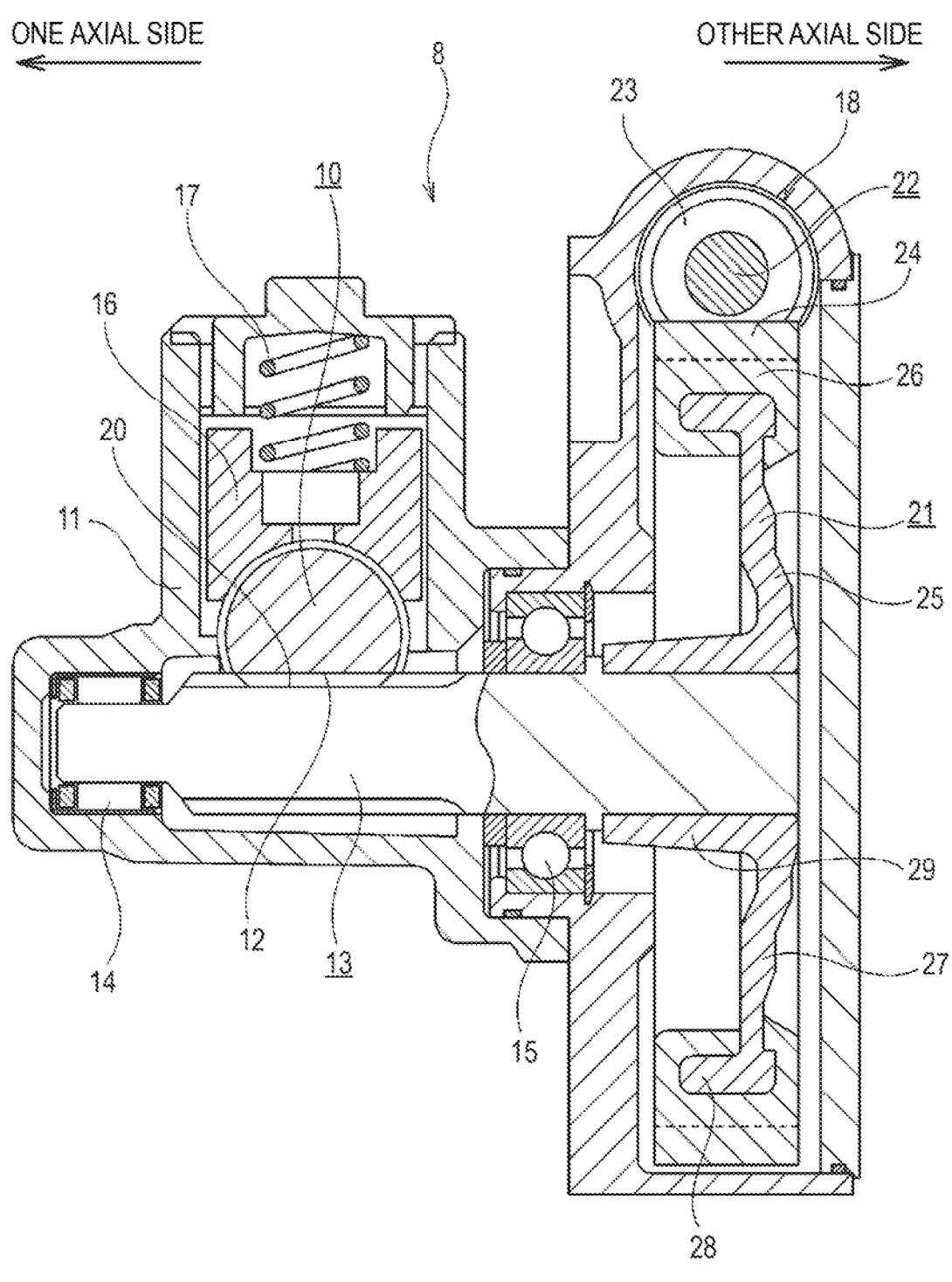
FIG. 3 is a cross-sectional view taken along a line B-B in FIG. 2.

FIGS. 1 to 3 show a crack assist type electric power steering device 1 in which a worm wheel of the present example is incorporated. The electric power steering device 1 of the present example includes a steering wheel 2, a steering shaft 3, a steering column 4, a pair of universal joints 5a and 5b, an intermediate shaft 6, a steering gear unit 7, and an electric assist device 8.

The steering wheel 2 is supported and fixed to a rear end portion of the steering shaft 3. The steering shaft 3 is rotatably supported inside the steering column 4 supported by a vehicle body. A front end portion of the steering shaft 3 is connected to a pinion shaft 9 of the steering gear unit 7 via the rear universal joint 5a, the intermediate shaft 6, and the front universal joint 5b. Therefore, when a driver rotates the steering wheel 2, the rotation of the steering wheel 2 is transmitted to the pinion shaft 9 via the steering shaft 3, the pair of universal joints 5a and 5b, and the intermediate shaft 6. The rotation of the pinion shaft 9 is convened into a linear motion of a rack shaft 10 of the steering gear unit 7 that meshes with the pinion shaft 9. As a result, a steering angle corresponding to a rotational operation amount of the steering wheel 2 is applied to a pair of steered wheels. The electric assist device 8 applies, to the rack shaft 10, auxiliary power generated using an electric motor as a power source. As a result, a force required for the driver to rotate the steering wheel 2 is reduced.

The steering gear unit 7 includes a housing 11 supported by the vehicle body, the rack shaft 10 supported in a manner of being movable only in an axial direction, that is, in a vehicle width direction inside the housing 11, and the pinion shaft 9 supported in a manner of being rotatable only in the vicinity of an one axial side portion (right side portion in FIG. 1) of the rack shaft 10 inside the housing 11. The pinion shaft 9 includes a pinion tooth portion on an outer circumferential surface of an axially intermediate portion (not shown) disposed inside the housing 11. The rack shaft 10 includes a first rack tooth portion that meshes with the pinion tooth portion of the pinion shaft 9 of a circumferential direction portion of an outer circumferential surface of the one axial side portion disposed inside the housing 11, and includes a second rack tooth portion 12 that meshes with a pinion tooth portion 20 of a pinion shaft 13 constituting the electric assist device 8 in a circumferential direction portion of an outer circumferential surface of the other axial side portion (left side portion in FIG. 1) disposed inside the housing 11 (see FIG. 3).

The electric assist device 8 includes the pinion shaft 13, a first bearing 14, a second bearing 15, a pressing block 16, a spring 17, a worm reduction gear 18, and an electric motor 19, which are assembled in the vicinity of the other axial side portion of the rack shaft 10 in the housing 11. The electric assist device 8 further includes a torque sensor (not shown).

The pinion shaft 13 is rotatably supported in the vicinity of the other axial side portion of the rack shaft 10 inside the housing 11. Specifically, the pinion shaft 13 includes the pinion tooth portion 20 on an outer circumferential surface of an axially intermediate portion thereof, and two portions of the pinion shaft 13 in the axial direction sandwiching the pinion tooth portion 20 from both axial sides are rotatably supported by the first bearing 14 and the second bearing 15 with respect to the housing 11. In the following description, with respect to the pinion shaft 13 and a worm wheel 21 to be described later, the one axial side is left sides in FIGS. 3 and 5, and the other axial side is right sides in FIGS. 3 and 5.

The pinion shaft 13 causes the pinion tooth portion 20 to mesh with the second rack tooth portion 12 of the rack shaft 10. The rack shaft 10 is elastically biased toward the pinion shaft 13 in order to eliminate a backlash of a meshing portion between the pinion tooth portion and the second rack tooth portion 12 and to appropriately maintain a meshing state of the meshing portion regardless of a meshing reaction force acting on the meshing portion between the pinion tooth portion 20 and the second rack tooth portion 12. For this purpose, the pressing block 16 and the spring 17 are held inside the housing 11 at a location opposite to the pinion shaft 13 with the rack shaft 10 interposed therebetween. Further, an elastic force of the spring 17 presses the pressing block 16 against the rack shaft 10, thereby elastically biasing the rack shaft 10 toward the pinion shaft 13.

The worm reduction gear 18 includes the worm wheel 21 and a worm 22. The worm wheel 21 is externally fitted and fixed to an outer circumferential surface of an end portion of the pinion shaft 13 on the other axial side by press-fitting. The worm 22 is coupled to an output shaft of the electric motor 19 supported by the housing 11 so as to transmit torque. Further, a worm tooth portion 23 provided on an outer circumferential surface of an axially intermediate portion of the worm 22 meshes with a wheel tooth portion 24 provided on an outer circumferential surface of the worm wheel 21. Accordingly, an auxiliary torque, that is, an auxiliary power can be applied from the electric motor 19 to the worm wheel 21 via the worm 22.

In the example, the worm wheel 21 includes an inner wheel element 25 and an outer wheel element 26.

Figure 4:
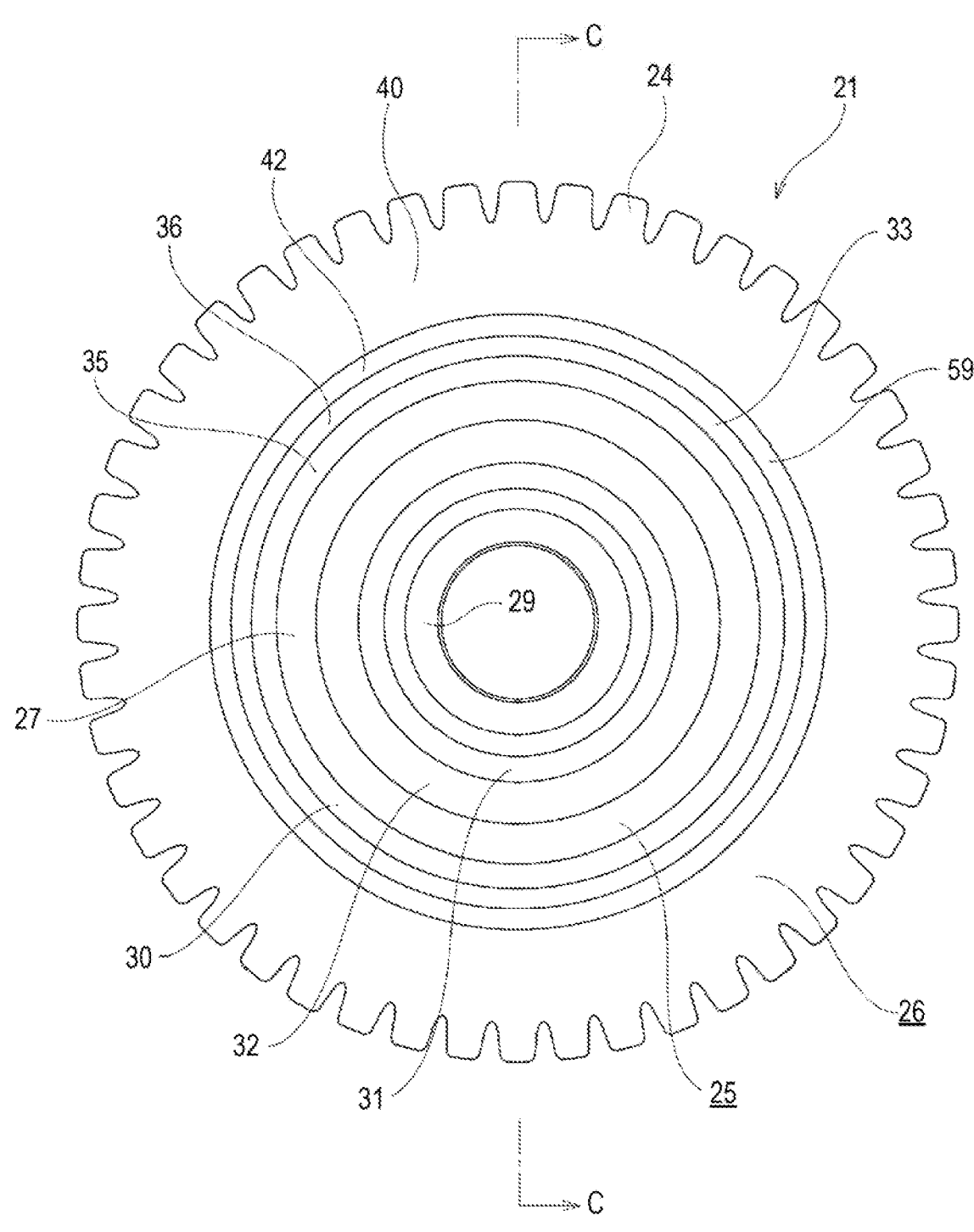
FIG. 4 is a view of the worm wheel according to the first embodiment as observed from an axial direction.
Figure 5:
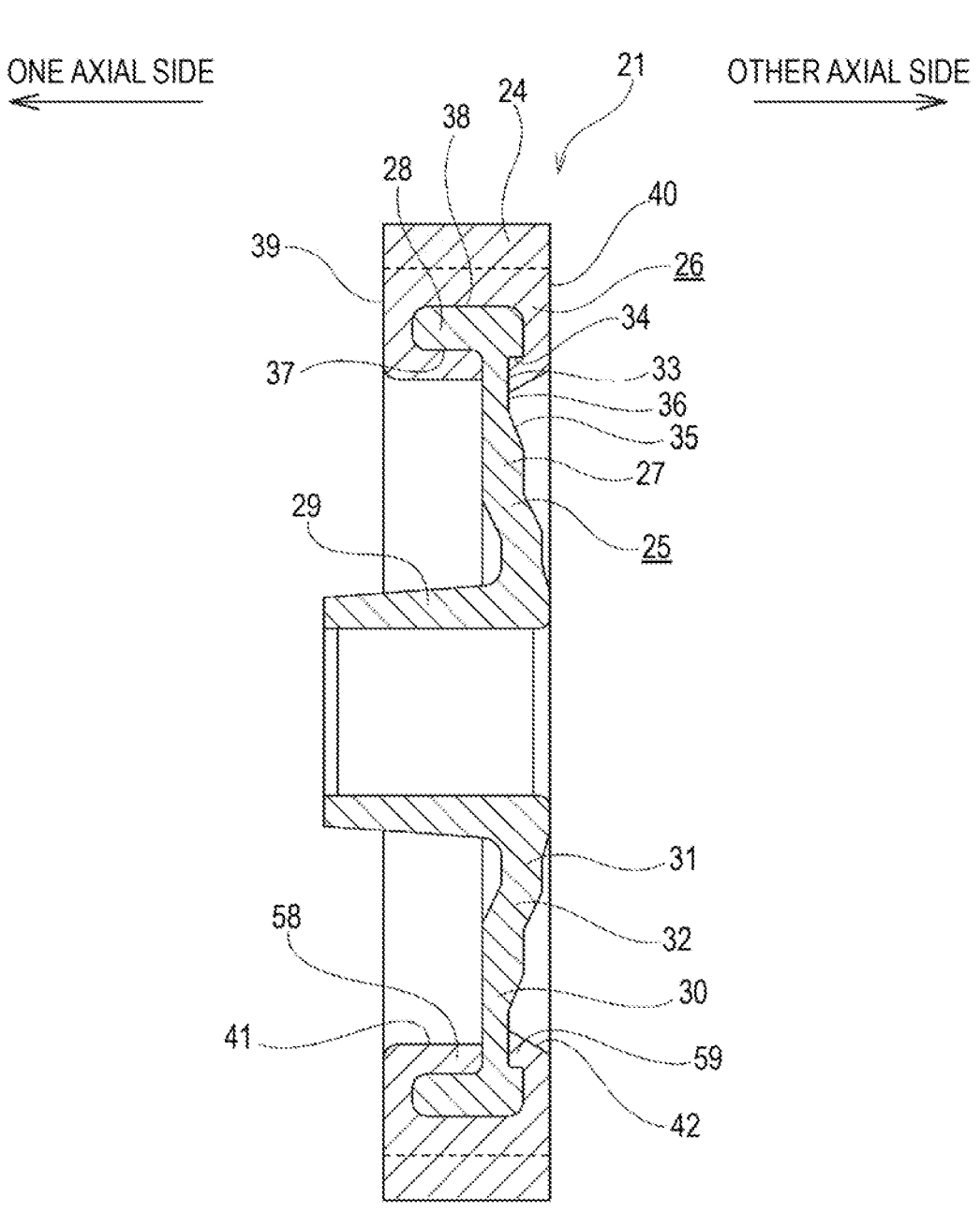
FIG. 5 is a cross-sectional view taken along a line C-C in FIG. 4.

As shown in FIGS. 4 and 5, the inner wheel element 25 is made of metal and has an annular shape. The inner wheel element 25 includes a side plate portion 27 having a hollow circular plate shape, a cylindrical eave portion 28 extending from a radially outer end portion of the side plate portion 27 toward the one axial side, and a cylindrical fitting tube portion 29 bent from a radially inner end portion of the side plate portion 27 toward the one axial side.

The side plate portion 27 includes a radially outer side plate portion 30 that forms a radially outer portion, a radially inner side plate portion 31 that forms a radially inner portion, and an intermediate side plate portion 32 that forms a radially intermediate portion located between the radially outer side plate portion 30 and the radially inner side plate portion 31. Each of the radially outer side plate portion 30 and the radially inner side plate portion 31 is formed in the hollow circular plate shape. On the other hand, the intermediate side plate portion 32 is formed in a conical cylindrical shape that is inclined in a direction toward the one axial side toward a radially outer side. That is, the radially outer side plate portion 30 is disposed in a manner of being offset to the one axial side with respect to the radially inner side plate portion 31.

The radially outer side plate portion 30 includes an annular recess 33, which is recessed toward the one axial side, over an entire circumference of a radially intermediate portion of a side surface on the other axial side. In a radially outer circumferential surface 34, a radially inner circumferential surface 35, and a bottom surface 36 that constitute an inner surface of the annular recess 33, the radially outer circumferential surface 34 is formed by a cylindrical surface centered on a central axis of the inner wheel element 25. The radially inner circumferential surface 35 is formed by a conical cylindrical surface inclined radially inward toward the other axial side. The bottom surface 36 is formed by a flat surface orthogonal to the central axis of the inner wheel element 25.

An inner circumferential surface 37 of the eave portion 28 is formed by a cylindrical surface centered on the central axis of the inner wheel element 25. An outer circumferential surface of the eave portion 28 and an outer circumferential surface of the side plate portion 27, that is, an outer circumferential surface of the radially outer side plate portion 30, are disposed on the same cylindrical surface centered on the central axis of the inner wheel element 25. That is, an outer circumferential surface 38 of the inner wheel element 25, which is formed by the outer circumferential surface of the eave portion 28 and the outer circumferential surface of the side plate portion 27, is formed by a single cylindrical surface centered on the central axis of the inner wheel element 25.

The fitting tube portion 29 is externally fitted and fixed to the outer circumferential surface of the end portion of the pinion shaft 13 on the other axial side by press-fitting. In the present example, a side surface of the fitting tube portion 29 on the one axial side protrudes further to the one axial side than a side surface of the eave portion 28 on the one axial side, and protrudes further to the one axial side than a side surface of the outer wheel element 26 on the one axial side. However, in a case of implementing the present invention, by setting an axial length of the fitting tube portion 29 to an appropriate size, the side surface of the fitting tube portion 29 on the one axial side can be disposed at an appropriate axial position. For example, the side surface of the fitting tube portion 29 on the one axial side can be disposed at substantially the same axial position as the side surface of the eave portion 28 on the one axial side or the side surface of the outer wheel element 26 on the one axial side.

As the metal constituting the inner wheel element 25, in addition to an iron alloy such as steel, various metals such as a copper alloy, an aluminum alloy, and a magnesium alloy can be adopted. As processing for forming the inner wheel element 25, various types of cutting and plastic working can be adopted. However, in order to form the inner wheel element 25 with a good yield and at a low cost, it is preferable to adopt the plastic working such as forging, pressing, and flow forming.

As shown in FIGS. 4 and 5, the outer wheel element 26 is made of a synthetic resin and has an annular shape. The outer wheel element 26 includes the wheel tooth portion 24 on an outer circumferential surface thereof, and is coupled and fixed to the inner wheel element 25 in a manner of covering a radially outer portion of the side plate portion 27 and the eave portion 28 which constitute the inner wheel element 25.

The wheel tooth portion 24 is provided over an entire width of the outer circumferential surface of the outer wheel element 26 in the axial direction. Each of a first side surface 39, which is the side surface of the outer wheel element 26 on the one axial side, and a second side surface 40, which is a side surface of the outer wheel element 26 on the other axial side, is formed by a flat surface orthogonal to a central axis of the worm wheel 21, that is, the central axis of the inner wheel element 25.

The outer wheel element 26 includes a first restriction portion 58 disposed on a radially inner side of the eave portion 28, and a second restriction portion 59 disposed radially inward of the radially outer circumferential surface 34 of the annular recess 33, that is, on a radially outer portion inside the annular recess 33. Then, based on engagement between the first restriction portion 58 and the inner circumferential surface 37 of the eave portion 28 and engagement between the second restriction portion 59 and the radially outer circumferential surface 34 of the annular recess 33, in other words, by holding a radially outer end portion of the inner wheel element 25 in a manner of embracing the end portion by the first restriction portion 58 and the second restriction portion 59, a holding force in a moment direction of the outer wheel element 26 with respect to the inner wheel element 25 is sufficiently ensured.

A first inner circumferential surface 41, which is an inner circumferential surface of the outer wheel element 26 on an one axial side portion, is formed by a cylindrical surface centered on the central axis of the worm wheel 21. The other axial side portion of the first inner circumferential surface 41 corresponds to an inner circumferential surface of the first restriction portion 58, and is disposed on the radially inner side of the eave portion 28.

A second inner circumferential surface 42, which is an inner circumferential surface of the outer wheel element 26 on the other axial side portion, is formed by a conical cylindrical surface inclined radially inward toward the one axial side. A one axial side portion of the second inner circumferential surface 42 corresponds to an inner circumferential surface of the second restriction portion 59, and is disposed on a radially inner side of the radially outer circumferential surface 34 of the annular recess 33. An end portion of the second inner circumferential surface 42 on the one axial side is connected to the bottom surface 36 of the annular recess 33. That is, a radially inner end portion of the other axial side portion of the outer wheel element 26 has a triangular cross-sectional shape in which a width dimension in an axial direction decreases, that is, the end portion tapers toward a radially inner side.

In addition to polyamide 66 (PA66), various synthetic resins such as polyamide 6 (PA6), polyamide 46 (PA46), polyamide 9T (PA9T), polyphenylene sulfide (PPS), polyethylene terephthalate (PET), polyacetal (POM), and a phenol resin (PF) can be used as the synthetic resin constituting the outer wheel element 26. If necessary, various reinforcing fibers such as glass fibers, polyethylene fibers, carbon fibers, and aramid fibers can be mixed into these synthetic resins.

In the electric power steering device 1 according to the present example, the torque sensor (not shown) constituting the electric assist device 8 detects a direction and a magnitude of the torque applied from the steering wheel 2 to the steering shaft 3. The electric motor 19 applies the auxiliary power to the rack shaft 10 via the worm wheel 21 and the pinion shaft 13 by rotationally driving the worm 22 based on a detection signal of the torque sensor, a vehicle speed signal output from a vehicle speed sensor incorporated in transmission, and the like. As a result, the force required for the driver to rotate the steering wheel 2 is reduced.

When the worm wheel 21 is manufactured, the outer wheel element 26 is formed by injection molding, and at the same time, the outer wheel element 26 is coupled to the inner wheel element 25.

Figure 6:
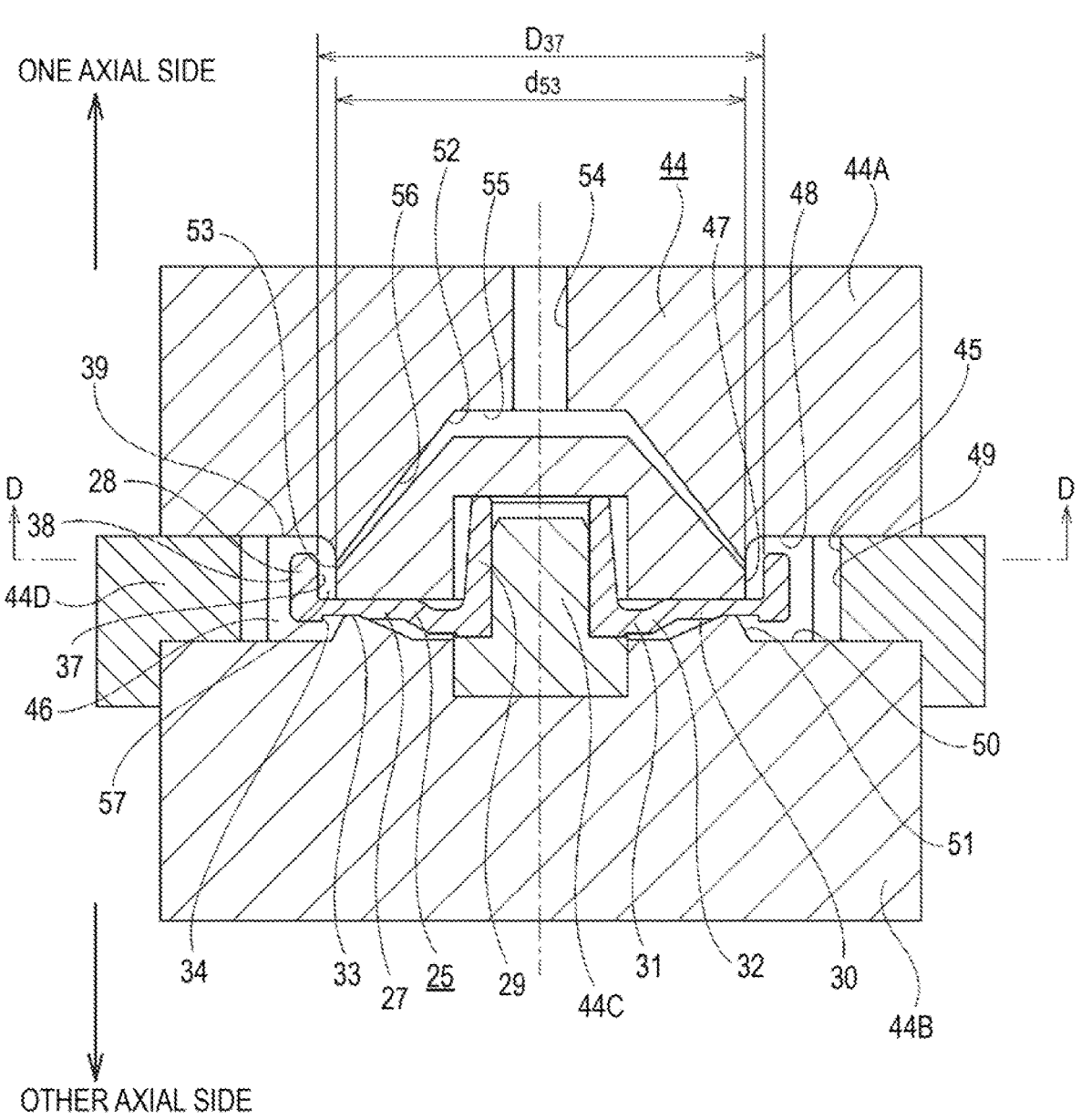
FIG. 6 is a cross-sectional view showing a mold for injection molding of an outer wheel element constituting the worm wheel according to the first embodiment.
Figure 7:
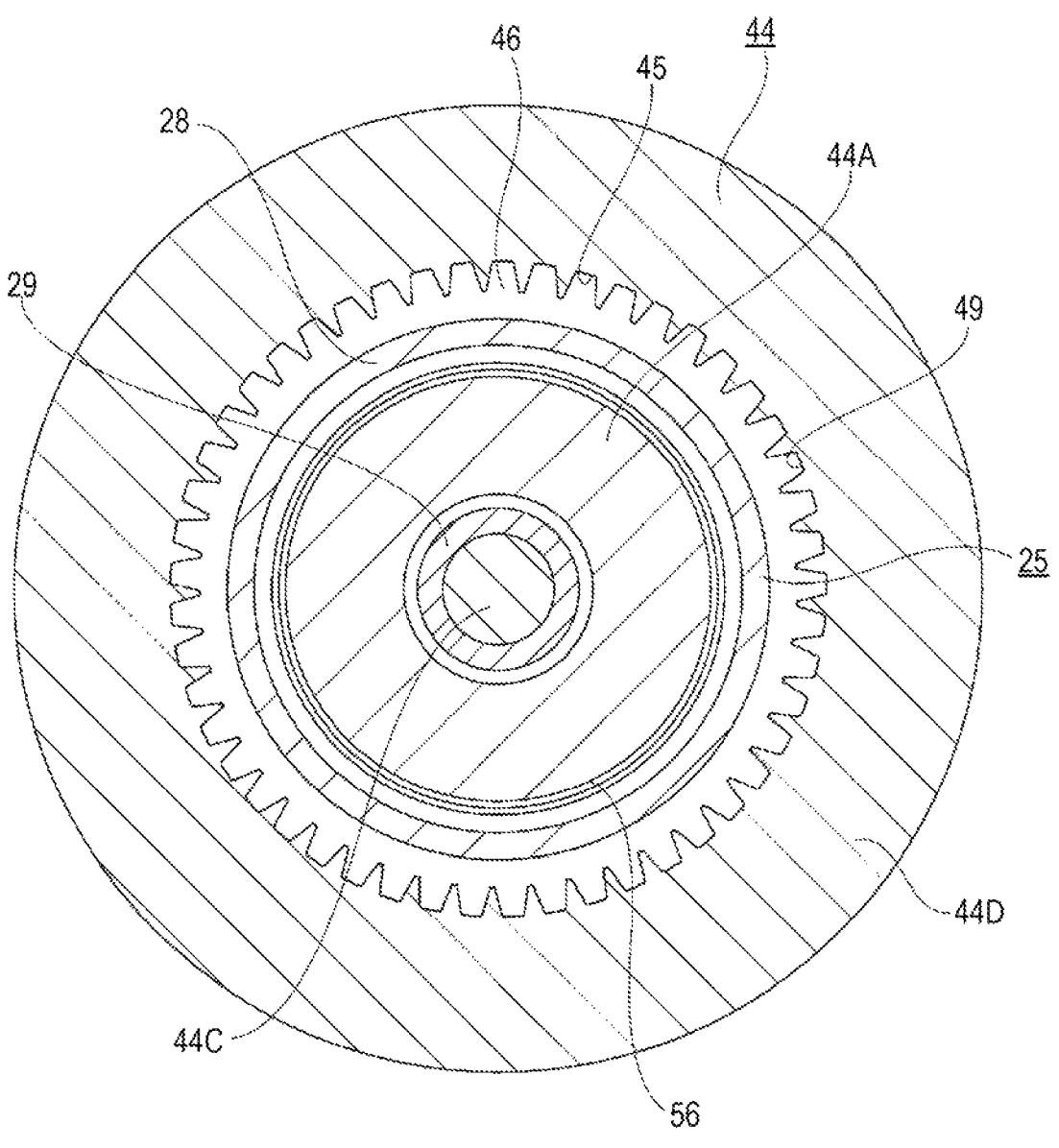
FIG. 7 is a cross-sectional view taken along a line D-D in FIG. 6.

When the outer wheel element 26 is formed by injection molding, first, as shown in FIGS. 6 and 7, the inner wheel element 25 is set in a mold 44 formed by combining a plurality of mold elements. That is, by disposing the mold 44 around a radially outer portion of the inner wheel element 25, an annular cavity 46, which is a molding space for the outer wheel element 26, is formed between an inner surface 45 of the mold 44 and a surface of the inner wheel element 25. A vertical direction in FIG. 6 does not necessarily match an actual vertical direction.

Figure 8:
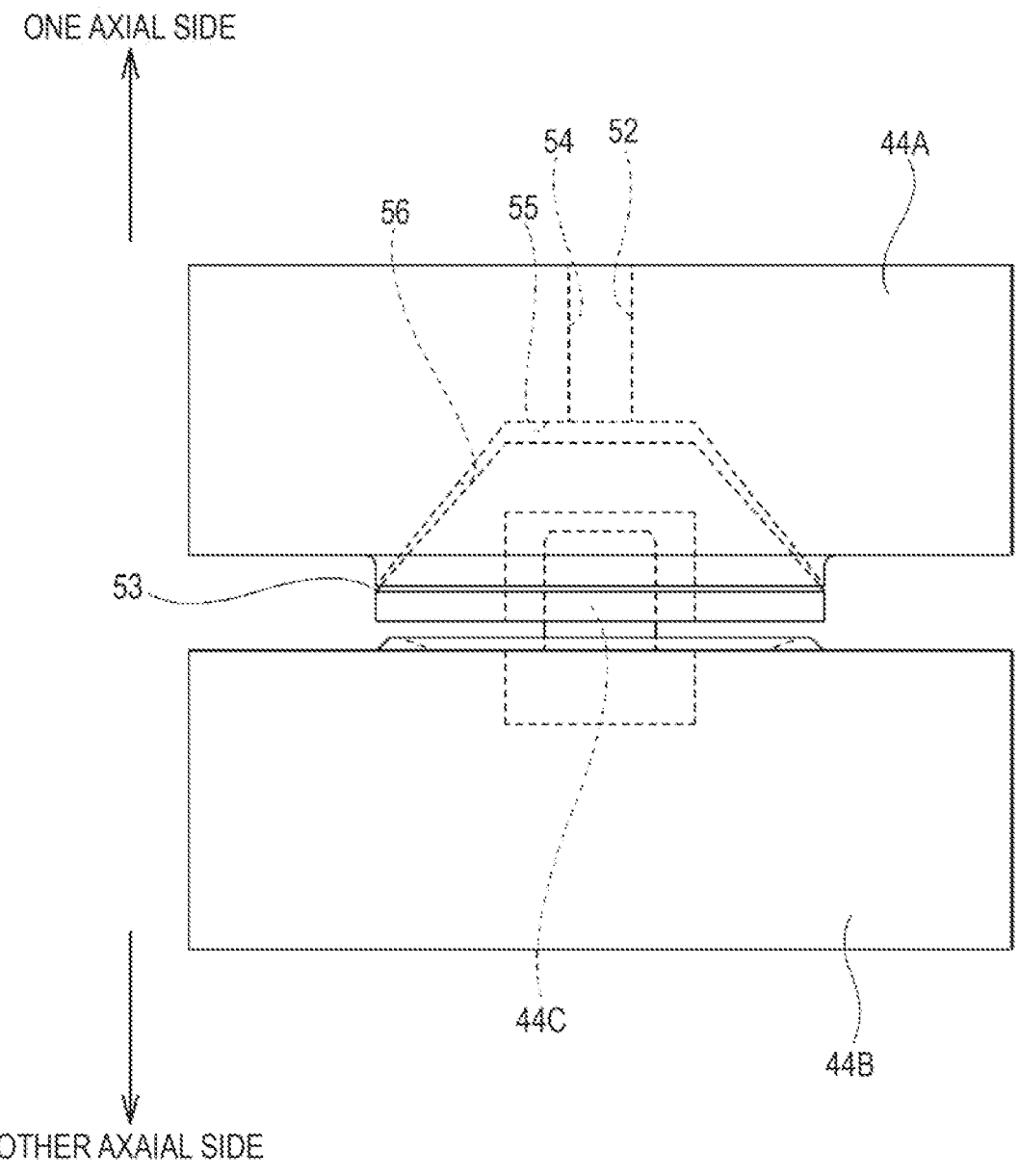
FIG. 8 is a partially-omitted side view showing the mold for the injection molding of the outer wheel element constituting the worm wheel according to the first embodiment.

In the illustrated example, the mold 44 includes, as mold elements constituting the mold 44, a first mold element 44A disposed on one axial side of the inner wheel element 25, a second mold element 44B disposed on the other axial side of the inner wheel element 25, a third mold element 44C disposed on a radially inner side of the inner wheel element 25, and a fourth mold element 44D disposed on a radially outer side of the inner wheel element 25. FIG. 8 is a side view of the mold 44 in which the fourth mold element 44D is omitted.

The inner surface 45 of the mold 44 constituting the cavity 46 has a shape matching an outer surface of the outer wheel element 26. That is, the inner surface 45 of the mold 44 includes a first inner circumferential surface molding portion 47 which is a portion having a shape matching the first inner circumferential surface 41, a first side surface molding portion 48 which is a portion having a shape matching the first side surface 39, a wheel tooth portion molding portion 49 which is a portion having a shape matching an outer peripheral surface of the wheel tooth portion 24, that is, a tooth tip surface, a tooth bottom surface, and a tooth surface connecting the tooth tip surface and the tooth bottom surface of the wheel tooth portion 24, a second side surface molding portion 50 which is a portion having a shape matching the second side surface 40, and a second inner circumferential surface molding portion 51 which is a portion having a shape matching the second inner circumferential surface 42. In the illustrated example, a cross-sectional shape of a connection portion between an end portion of the first inner circumferential surface 41 on the one axial side and a radially inner end portion of the first side surface 39, that is, a cross-sectional shape of a connection portion between an end portion of the first inner circumferential surface molding portion 47 on the one axial side and a radially inner end portion of the first side surface molding portion 48, which is a portion having a shape matching the connection portion, is an arc shape, but these cross-sectional shapes of the connection portions may be an L shape in which straight lines intersect at a right angle.

In the illustrated example, the first inner circumferential surface molding portion 47 and the first side surface molding portion 48 are provided in the first mold element 44A. The wheel tooth portion molding portion 49 is provided in the third mold element 44C. The second side surface molding portion 50 and the second inner circumferential surface molding portion 51 are provided in the second mold element 44B.

Figure 9:
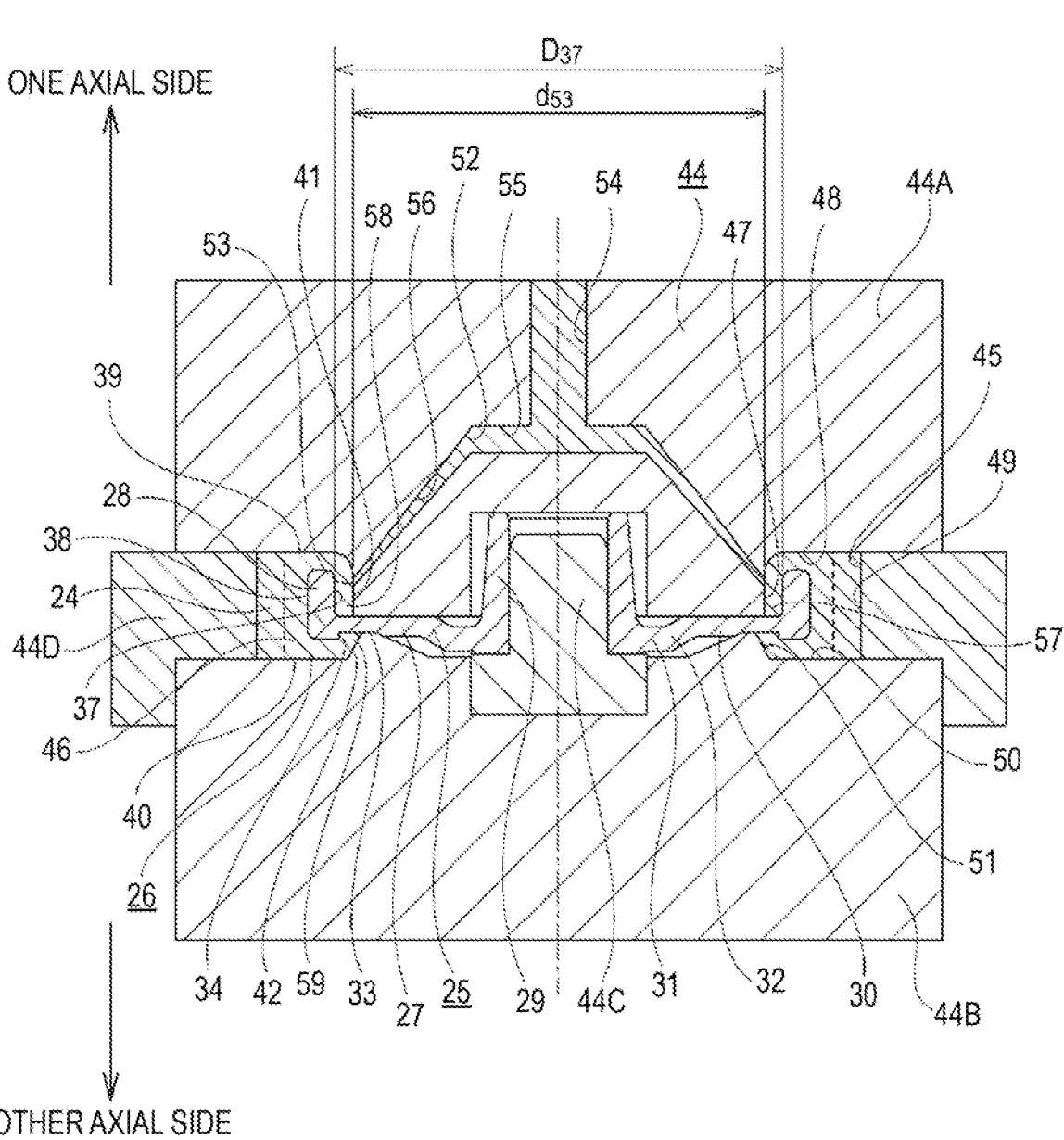
FIG. 9 is a cross-sectional view showing a step of injection molding the outer wheel element constituting the worm wheel according to the first embodiment of the present invention.
Figure 10:
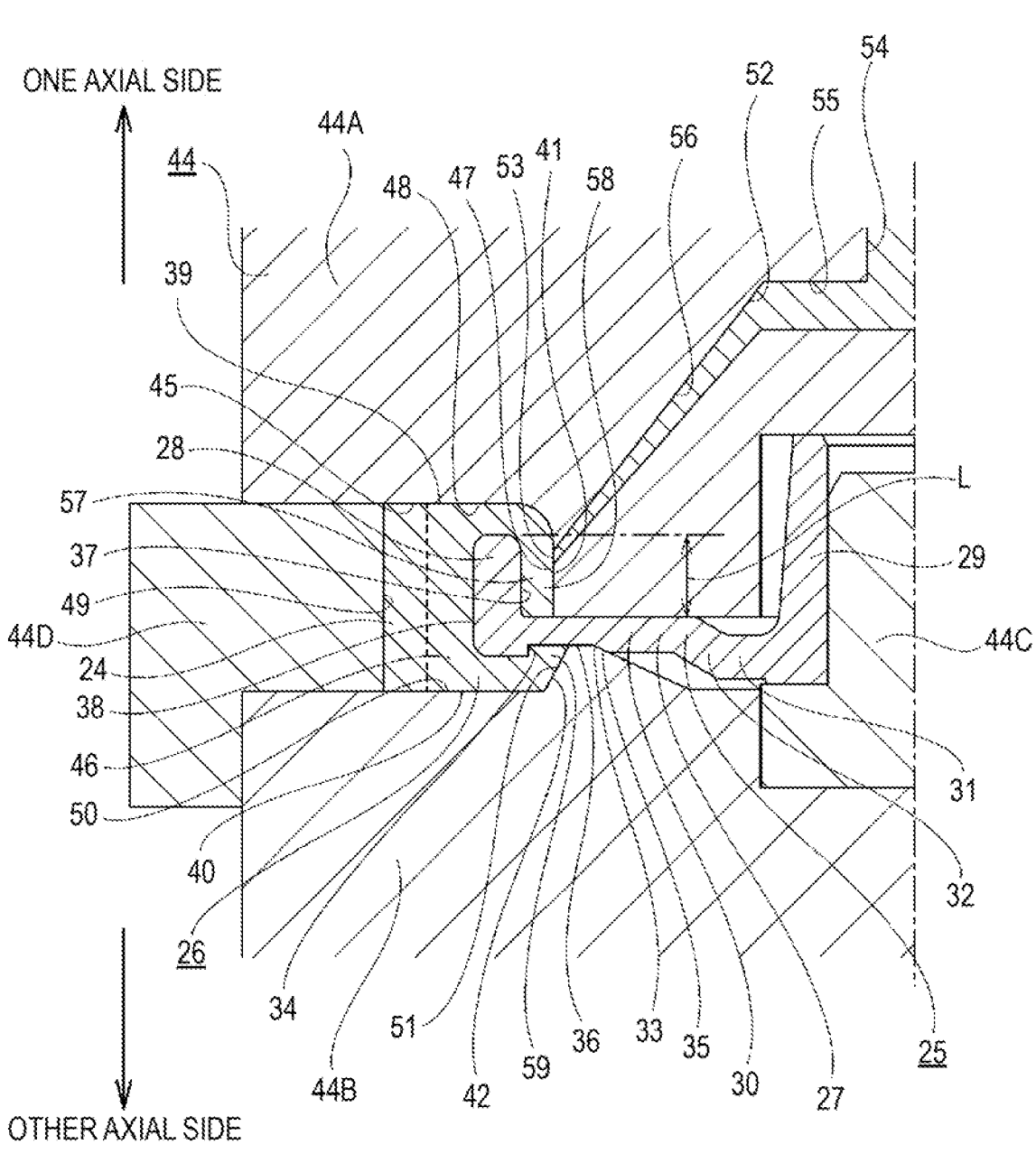
FIG. 10 is an enlarged view of a left side portion in FIG. 9.
Figure 11:
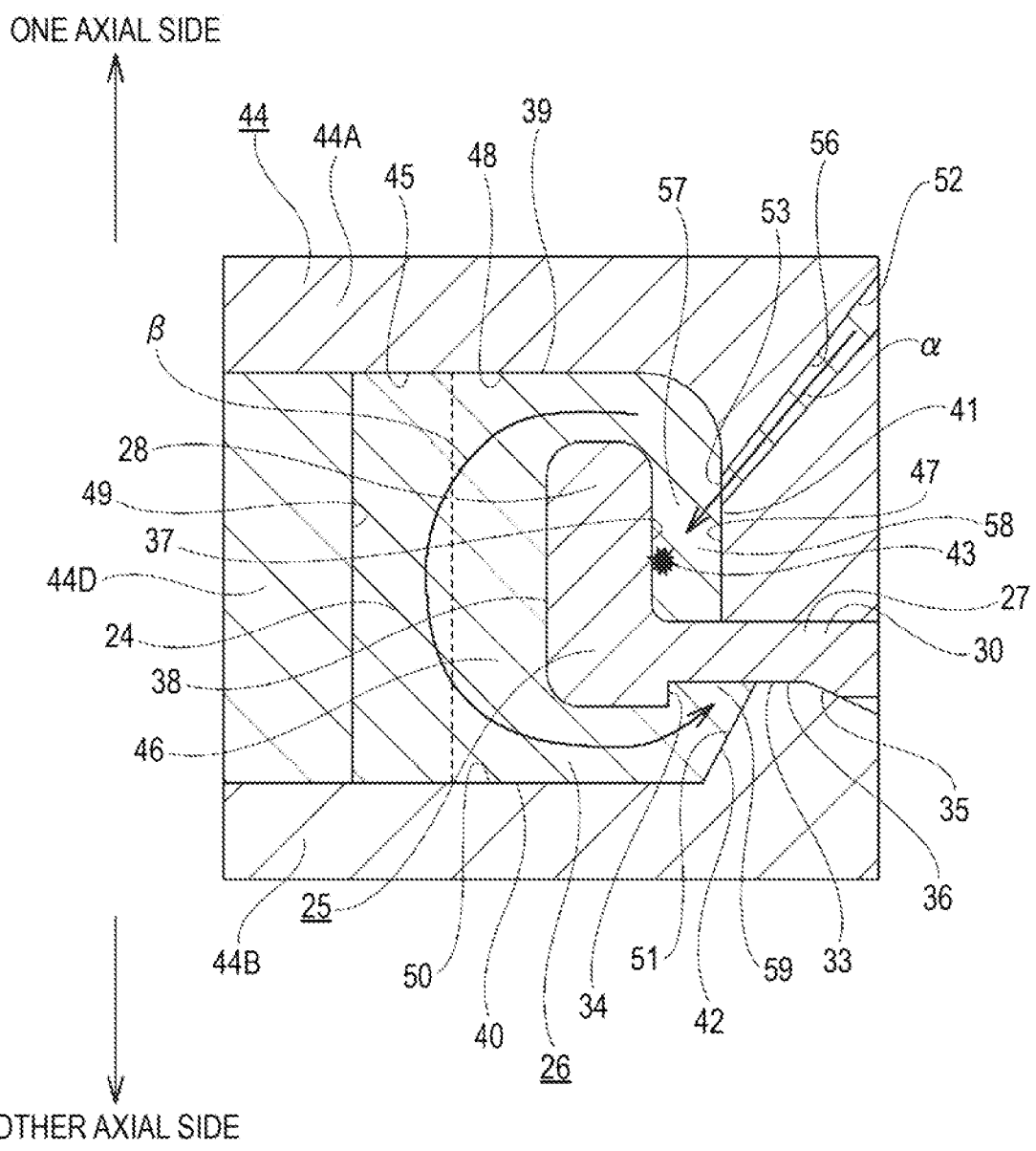
FIG. 11 is an enlarged view of a left side portion in FIG. 10.

After the cavity 46 is formed as described above, the molten synthetic resin is fed into the cavity 46 through a runner 52 and an injection gate 53 provided in the mold 44. FIGS. 9 to 11 show a state in which insides of the runner 52, the injection gate 53, and the cavity 46 are filled with the synthetic resin.

The runner 52 is provided in a portion of the mold 44 disposed on the one axial side of the inner wheel element 25, that is, inside the first mold element 44A. The runner 52 includes a first runner portion 54 that is a columnar passage disposed coaxially with the central axis of the inner wheel element 25, a second runner portion 55 that is a disk-shaped passage extending radially outward from an end portion (downstream end portion) of the first runner portion 54 on the other axial side, and a third runner portion 56 that is a conical cylindrical passage extending radially outward from a radially outer end portion (downstream end portion) of the second runner portion 55 toward the other axial side and disposed coaxially with the central axis of the inner wheel element 25. The runner 52 is a hot runner around which a heater (not shown) is disposed, and the synthetic resin can be held in a molten state inside the runner 52.

The injection gate 53 is disposed at an end portion (downstream end portion) of the third runner portion 56 on the other axial side, and is formed in an annular shape coaxial with the central axis of the inner wheel element 25. The injection gate 53 opens to the first inner circumferential surface molding portion 47 constituting the inner surface 45 of the mold 44, and faces the inner circumferential surface 37 of the eave portion 28 of the inner wheel element 25. That is, a diameter (inner diameter of the eave portion 28) D37 of the inner circumferential surface 37 of the eave portion 28 is larger than a diameter d53 of the annular injection gate 53 (D37>d53 (see FIGS. 6 and 9)). The injection gate 53 is disposed at a position overlapping with the eave portion 28 in a radial direction, that is, within an axial range L (see FIG. 10) between the side surface of the eave portion 28 on the one axial side and a side surface of the side plate portion 27 on the one axial side. The injection gate 53 is an open gate including no valve for opening and closing an opening.

In the present example, the molten resin fed through the runner 52 in an order of the first runner portion 54, the second runner portion 55, and the third runner portion 56 is fed from the annular injection gate 53 toward a pocket portion 57 that is continuous over an entire circumference of the cavity 46 and present on the radially inner side of the eave portion 28, as indicated by an arrow α in FIG. 11. The pocket portion 57 is a molding space of the first restriction portion 58 constituting the outer wheel element 26 in the cavity 46. That is, the pocket portion 57 is a cylindrical molding space defined by the inner circumferential surface 37 of the eave portion 28, a radially outer end portion of a side surface of the side plate portion 27 on the one axial side, and the first inner circumferential surface molding portion 47 of the mold 44.

In the present example, the molten resin fed into the pocket portion 57 of the cavity 46 from the annular injection gate 53 is first filled into the entire pocket portion 57, fills the entire pocket portion 57, and then overflows from an end portion of the pocket portion 57 on the one axial side. Further, as indicated by an arrow β in FIG. 11, the molten resin overflowing from the end portion of the pocket portion 57 on the one axial side flows toward a portion present between a side surface of the radially outer portion of the side plate portion 27 on the other axial side and the second side surface molding portion 50 and the second inner circumferential surface molding portion 51 via a portion present between the side surface of the eave portion 28 on the one axial side and the first side surface molding portion 48 and a portion present between the outer circumferential surface 38 of the inner wheel element 25 and the wheel tooth portion molding portion 49.

Thereafter, the synthetic resin cooled and solidified in the cavity 46, that is, the outer wheel element 26 is taken out from the cavity 46 by opening the mold 44, and at the same time, the outer wheel element 26 is separated from the molten resin remaining inside the runner 52 at a position of the injection gate 53. Further, a surface and a corner portion of the outer wheel element 26 are subjected to finishing as necessary, thereby completing the worm wheel 21.

Therefore, an annular injection gate mark is formed on a surface of the first inner circumferential surface 41 of the outer hall element 26 so as to correspond to the injection gate 53.

According to a method for manufacturing the worm wheel of the present example as described above, shape accuracy and durability of the wheel tooth portion 24 of the worm wheel 21 are easily ensured.

That is, in the present example, the molten resin fed into the pocket portion 57 of the cavity 46 from the annular injection gate 53 is first filled into the entire pocket portion 57, fills the entire pocket portion 57, and then overflows from the end portion of the pocket portion 57 on the one axial side. Further, as indicated by the arrow β in FIG. 11, the molten resin overflowing from the end portion of the pocket portion 57 on the one axial side flows toward the portion present between the side surface of the radially outer portion of the side plate portion 27 on the other axial side and the second side surface molding portion 50 and the second inner circumferential surface molding portion 51 via the portion present between the side surface of the eave portion 28 on the one axial side and the first side surface molding portion 48 and the portion present between the outer circumferential surface 38 of the inner wheel element 25 and the wheel tooth portion molding portion 49. In particular, in the present example, since the pocket portion 57 is formed in a cylindrical shape continuous over the entire circumference, the molten resin overflowing from the end portion of the pocket portion 57 on the one axial side flows substantially simultaneously over the entire circumference as indicated by the arrow β in FIG. 11. Therefore, the cooling and the solidification of the molten resin in the cavity 46 can proceed substantially simultaneously over the entire circumference. Therefore, it is easy to ensure shape accuracy of the entire outer wheel element 26 including the wheel tooth portion 24. Therefore, when the worm wheel 21 is used, it is possible to prevent generation of abnormal noise or vibration at a meshing portion between the wheel tooth portion 24 and the worm tooth portion 23.

In the present example, since a cross-sectional shape of a connection portion between the end portion of the first inner circumferential surface molding portion 47 on the one axial side and the radially inner end portion of the first side surface molding portion 48 in the inner surface 45 of the mold 44 is an arc shape, it is possible to smoothly change a flow of the molten resin overflowing from the end portion of the pocket portion 57 on the one axial side along the connection portion. Therefore, the flow of the molten resin in the cavity 46 is improved accordingly, and the shape accuracy of the outer wheel element 26 can be improved.

In the present example, the runner 52 of the mold 44 is the hot runner. Therefore, unlike a case in which a runner of a mold is a cold runner, it is not necessary to discard the synthetic resin remaining inside the runner 52 after the injection molding, and the synthetic resin can be used for the next injection molding, and thus a material cost of the outer wheel element 26 can be reduced. In the present example, the runner 52 of the mold 44 is the hot runner, and the injection gate 53 is the open gate. Therefore, a structure of the mold 44 can be simplified and the mold 44 can be manufactured at a low cost, as compared with a case in which a runner of a mold is the hot runner and an injection gate is a valve gate including a valve for opening and closing an opening.

On the other hand, in the case in which the runner 52 of the mold 44 is the hot runner and the injection gate 53 is the open gate as in the present example, the molten resin in the vicinity of the injection gate 53 comes into contact with air and is cooled and solidified after the injection molding of the outer wheel element 26 is completed and before a next outer wheel element 26 is injection molded, thereby forming a cold slug 43. Further, when the next outer wheel element 26 is injection molded, the cold slug 43 may be fed into the cavity 46 from the injection gate 53 together with the molten resin.

In the present example, specifically, the cold slug 43 is fed from the injection gate 53 toward the pocket portion 57 of the cavity 46 in a mode of flowing at a head of the molten resin. Further, the cold slug 43 fed into the pocket portion 57 in this manner first collides with a part of a surface defining the pocket portion 57 (in an example illustrated in FIG. 11, the inner circumferential surface 37 of the eave portion 28). After that, the molten resin suctions the cold slug 43 so as to cover the cold slug 43 from a rear side, and comes into contact with a peripheral portion of the cold slug 43 on the surface defining the pocket portion 57, thereby rapidly cooling and solidifying the molten resin. As a result, the cold slug 43 remains inside the pocket portion 57 and is held. That is, in the present example, the cold slug 43 fed from the injection gate 53 to the cavity 46 is held inside the pocket portion 57 and then prevented from flowing to an outside of the pocket portion 57. Therefore, in the present example, it is possible to prevent the cold slug 43 from flowing to the wheel tooth portion molding portion 49. Therefore, it is possible to prevent the cold slug 43 from adhering to the wheel tooth portion molding portion 49 to deteriorate the shape accuracy of the wheel tooth portion 24, and to prevent formation of a portion on an inner side of the wheel tooth portion 24 on which a stress caused by damage such as a crack is likely to be concentrated. Therefore, it is possible to easily ensure the shape accuracy and the durability of the wheel tooth portion 24.

A shape of the cold slug 43 is amorphous. For example, the cold slug 43 has an outer diameter equal to or smaller than an opening width of the injection gate 53, or has a linear shape or an annular shape according to a shape of the injection gate 53.

In the present example, a portion of the cavity 46 which forms the radially inner end portion of the other axial side portion of the outer wheel element 26, that is, a terminating portion of the flow of the molten resin indicated by the arrow β in FIG. 11, is present at a position sandwiched between the inner surface 45 of the mold 44 and the surface of the inner wheel element 25 in the axial direction, and specifically, is present at a position sandwiched between the second inner circumferential surface molding portion 51 and the bottom surface 36 of the annular recess 33. The terminating portion of the flow of the molten resin indicated by the arrow β in FIG. 11 has a tapered cross-sectional shape in which a width dimension in the axial direction decreases toward a radially inner end portion which is a terminating edge portion, that is, a triangular cross-sectional shape. That is, in a structure of the present example, since the second inner circumferential surface molding portion 51 is formed by a conical cylindrical surface inclined radially inward toward the one axial side, and the bottom surface 36 of the annular recess 33 is formed by a flat surface orthogonal to the central axis of the inner wheel element 25, the terminating portion has the triangular cross-sectional shape. In other words, in the structure of the present example, a cross-sectional area of the terminating portion of the flow of the molten resin indicated by the arrow β in FIG. 11 decreases toward a radially inner side end edge portion which is the terminating edge portion.

In a case of implementing the present invention, an air vent (for example, a minute gap having a width of about 10 μm), which is a passage for discharging air present inside the cavity 46 to an outside of the cavity 46, can also be provided in a portion located on a radially inner side of the terminating portion of the flow of the molten resin indicated by the arrow β in FIG. 11 in a portion between a surface of the mold 44 and the surface of the inner wheel element 25. By providing such an air vent, it is possible to efficiently discharge the air pushed by the molten resin to the outside of the cavity 46 through the air vent, and thus it is possible to prevent an occurrence of a burn or a void (void or underfill) at the radially inner end portion of the other axial side portion of the outer wheel element 26.

In particular, in the present example, since the terminating portion of the flow of the molten resin indicated by the arrow β in FIG. 11 has the tapered cross-sectional shape, the discharge of the air through the air vent is improved, and it is possible to effectively prevent the generation of the void at the radially inner end portion of the other axial side portion of the outer wheel element 26. On the other hand, if the inner circumferential surface molding portion 51 is formed by a cylindrical surface, that is, if an angle formed by the second side surface molding portion 50 and the second inner circumferential surface molding portion 51 is a right angle and the terminating portion of the flow of the molten resin does not have the tapered cross-sectional shape, it is difficult to satisfactorily discharge the air through the air vent, and air may accumulate in the vicinity of a connection portion between the second side surface molding portion 50 and the second inner circumferential surface molding portion 51 to generate the void compared to the case of the present example.

If the inner circumferential surface molding portion 51 is formed by the cylindrical surface, a frictional force acts between the inner circumferential surface molding portion 51 and the second inner circumferential surface 42 when a product (worm wheel 21) is pulled out in the axial direction with respect to the second mold element 44B after the outer wheel element 26 is injection molded. Therefore, smoothness of the pulling-out is reduced accordingly. On the other hand, in the present example, since the second inner circumferential surface molding portion 51 is formed by the conical cylindrical surface, the inner circumferential surface molding portion 51 and the second inner circumferential surface 42 are immediately separated from each other when the product (worm wheel 21) is pulled out in the axial direction with respect to the second mold element 44B after the outer wheel element 26 is injection molded. Therefore, smoothness of the pulling-out can be increased accordingly.

In the worm wheel 21 manufactured by the manufacturing method of the present example, the cold slug 43 is held only in the first restriction portion 58 of the outer wheel element 26, but presence or absence of the cold slug 43 inside the outer wheel element 26 can be visually determined by cutting the outer wheel element 26, and can be determined by a non-destructive inspection such as observation of an internal structure of the outer wheel element 26 using X-rays. When the method for manufacturing the worm wheel according to the present invention is carried out, the runner of the mold can also be the hot runner, and the injection gate can also be the valve gate. In this case, it is easy to manufacture the worm wheel 21 including no cold slug 43 inside the outer wheel element 26.

Second Embodiment

Figure 12:
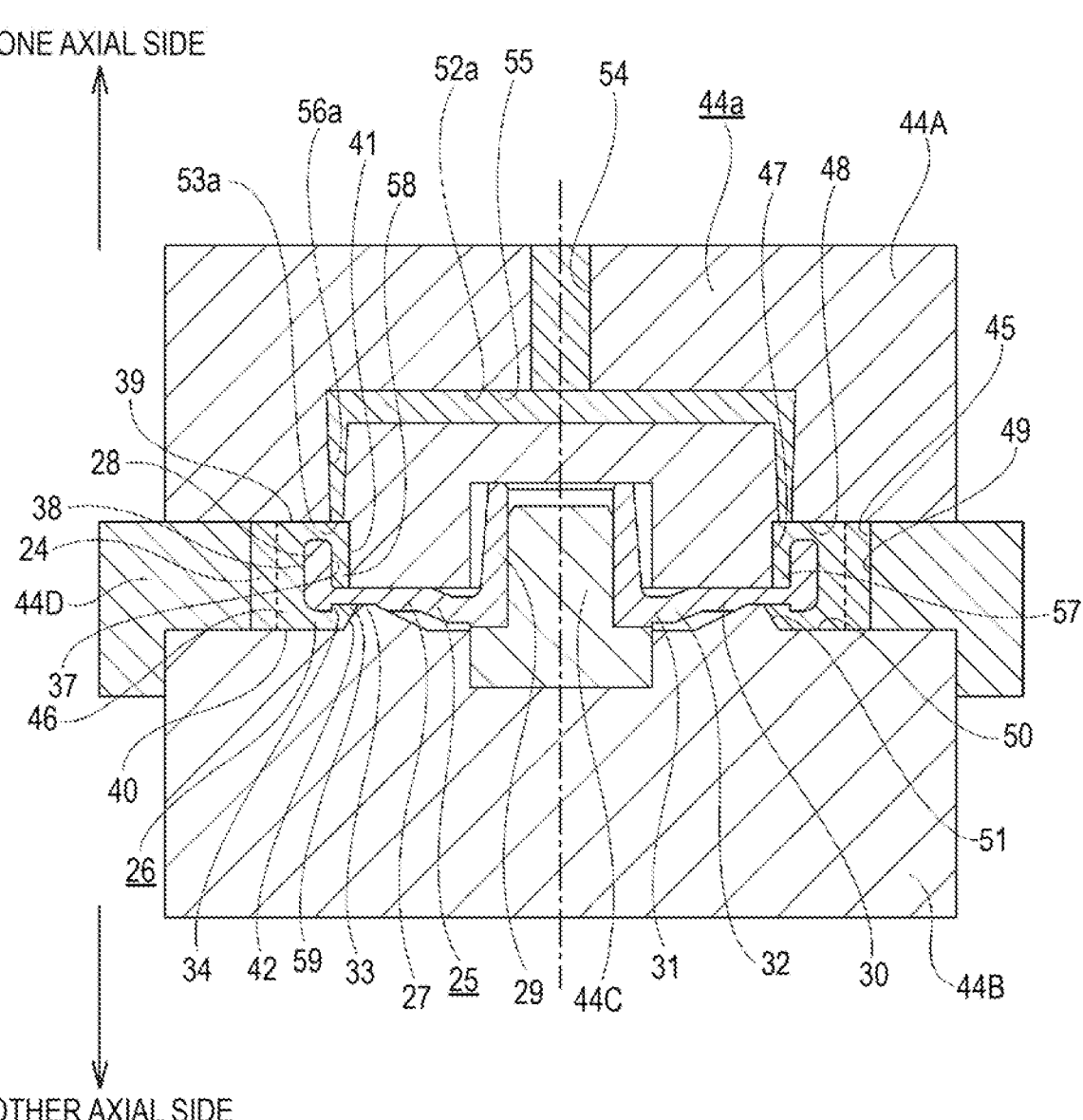
FIG. 12 is a view corresponding to FIG. 9 and showing a second embodiment of the present invention.

A second embodiment of the present invention will be described with reference to FIG. 12.

In the present example, a third runner portion 56a constituting a runner 52a of a mold 44a is formed in a cylindrical shape extending from a radially outer end portion of the second runner portion 55 toward the other axial side, and an annular injection gate 53a disposed at an end portion of the third runner portion 56a on the other axial side is opened to a radially inner end portion of the first side surface molding portion 48. Accordingly, the injection gate 53a is axially opposed to a radially outer end portion of a side surface of the side plate portion 27 constituting the inner wheel element 25 on the one axial side. Further, when the outer wheel element 26 is injection molded, the molten resin is fed from the injection gate 53a toward the pocket portion 57 of the cavity 46.

Other configurations, operations, and effects are the same as those of the first embodiment.

Third Embodiment

Figure 13:
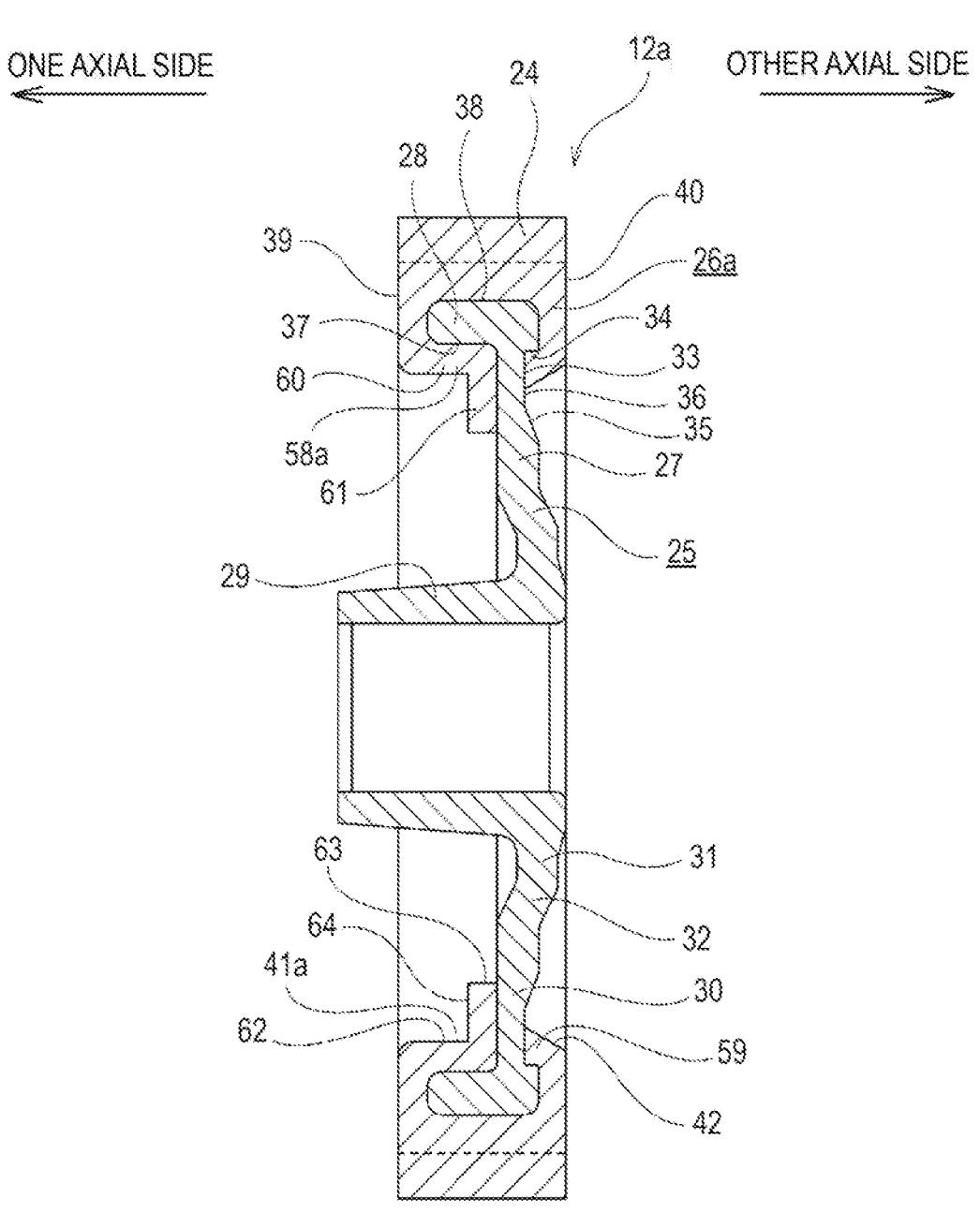
FIG. 13 is a cross-sectional view of a worm wheel according to a third embodiment of the present invention.
Figure 14:
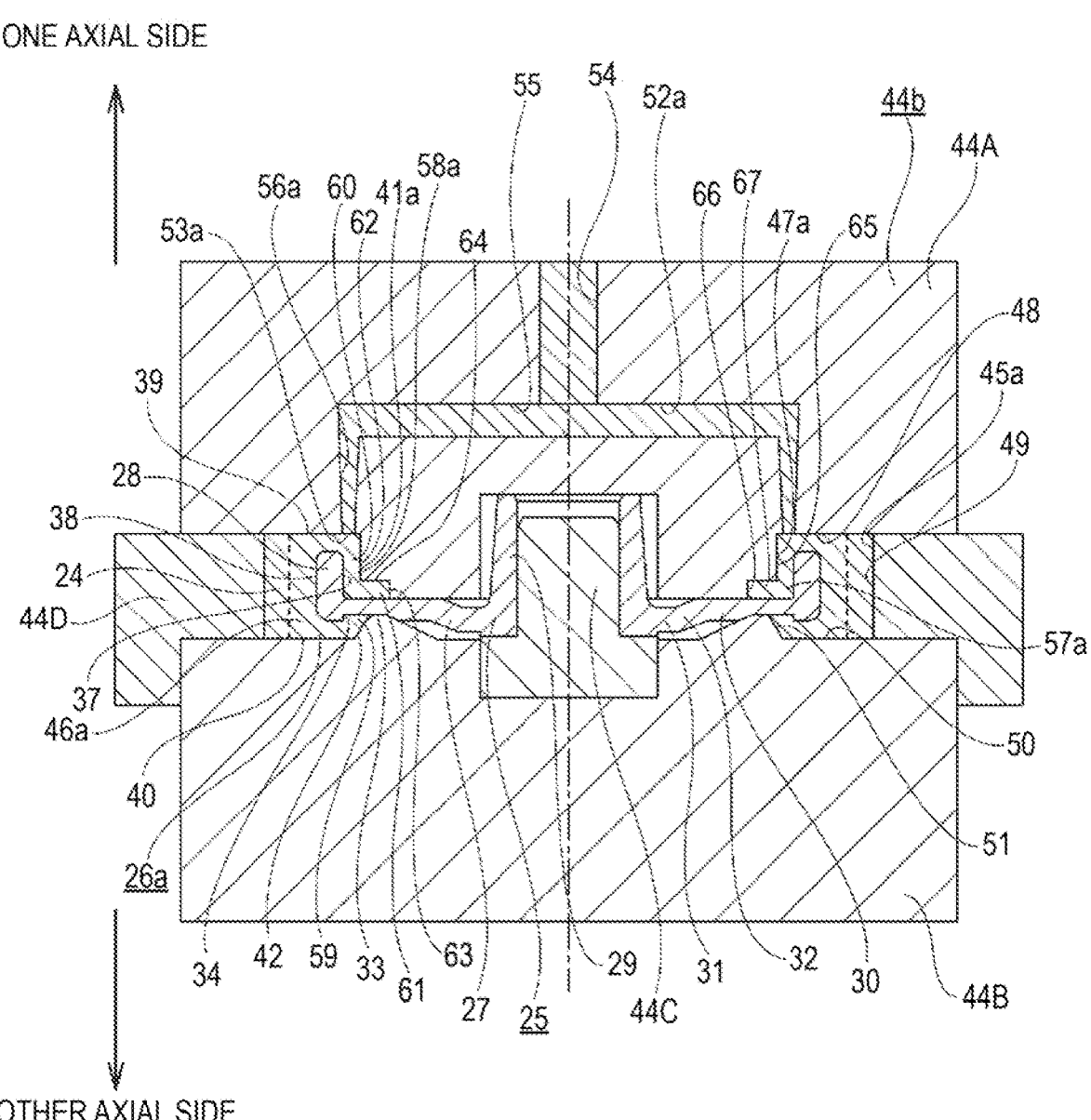
FIG. 14 is a view corresponding to FIG. 9 and showing the third embodiment of the present invention.

A third embodiment of the present invention will be described with reference to FIGS. 13 and 14.

In the present example, a first restriction portion 58a of an outer wheel element 26a constituting a worm wheel 21a to be manufactured includes a cylindrical portion 60 disposed adjacent to a radially inner side of the inner circumferential surface 37 of the eave portion 28, and an inward flange portion 61 having a hollow circular plate shape which extends toward the radially inner side over an entire circumference from a half portion of the cylindrical portion 60 on the other axial side. That is, in a structure of the first embodiment (see FIG. 5), the first restriction portion 58 is formed by only the cylindrical portion disposed adjacent to the radially inner side of the inner circumferential surface 37 of the eave portion 28, whereas in a structure of the present example, the first restriction portion 58a is formed by the cylindrical portion 60 and the inward flange portion 61, so that a holding force of the outer wheel element 26a with respect to the inner wheel element 25 in a moment direction can be more sufficiently ensured.

In the structure of the present example, a first inner circumferential surface 41a, which is an inner circumferential surface of an one axial side portion of the outer wheel element 26a, is formed in a stepped cylindrical shape by a large diameter inner circumferential surface 62 located on the one axial side with respect to the inward flange portion 61, a small diameter inner circumferential surface 63, which is an inner circumferential surface of the inward flange portion 61 and has a smaller diameter than the large diameter inner circumferential surface 62, and a connection surface 64, which is a side surface of the inward flange portion 61 on the one axial side and connects the large diameter inner circumferential surface 62 and the small diameter inner circumferential surface 63. Each of the large diameter inner circumferential surface 62 and the small diameter inner circumferential surface 63 is formed by a cylindrical surface centered on a central axis of the worm wheel 21a. The connection surface 64 is formed by a flat surface orthogonal to the central axis of the worm wheel 21a.

Further, in the present example, a first inner circumferential surface molding portion 47a constituting an inner surface 45a of a mold 44b includes a large diameter surface portion 65 having a shape corresponding to the large diameter inner circumferential surface 62, a small diameter surface portion 66 having a shape corresponding to the small diameter inner circumferential surface 63, and a connection surface portion 67 having a shape corresponding to the connection surface 64. In other words, the mold 44b includes the first inner circumferential surface molding portion 47a which is a stepped cylindrical surface portion including the large diameter surface portion 65 facing an inner circumferential surface of an one axial side portion of the eave portion 28, the small diameter surface portion 66 facing an inner circumferential surface of the other axial side portion of the eave portion 28, and the connection surface portion 67 connecting the large diameter surface portion 65 and the small diameter surface portion 66. Further, the mold 44b further includes the first side surface molding portion 48 corresponding to a side surface molding portion that is bent radially outward from an end portion of the large diameter surface portion 65 on the one axial side.

Further, in the present example, a pocket portion 57a of a cavity 46a is defined by the inner circumferential surface 37 of the eave portion 28, a radially outer end portion of a side surface of the side plate portion 27 on the one axial side, and the first inner circumferential surface molding portion 47a of the mold 44b, and has an L-shaped cross-sectional shape.

In the present example, a third runner portion 56a constituting the runner 52a of the mold 44b is formed in a cylindrical shape extending from a radially outer end portion of the second runner portion 55 toward the other axial side, and the annular injection gate 53a disposed at an end portion of the third runner portion 56a on the other axial side is opened to a radially inner end portion of the first side surface molding portion 48. Accordingly, the injection gate 53a is axially opposed to a radially outer end portion of a side surface of the side plate portion 27 constituting the inner wheel element 25 on the one axial side. Further, when the outer wheel element 26 is injection molded, the molten resin is fed from the injection gate 53a toward the pocket portion 57a of the cavity 46a.

In the present example, since the cross-sectional shape of the pocket portion 57a is the L shape, it is possible to more effectively prevent a cold slug from flowing to the wheel tooth portion molding portion 49 by controlling a flow of the molten resin in the pocket portion 57a. That is, in the present example, the molten resin fed from the injection gate 53a toward the pocket portion 57a of the cavity 46a first flows to a radially inner end portion which is an end portion on a back side of the pocket portion 57a, fills a radially inner portion of the pocket portion 57a, that is, a portion that molds the inward flange portion 61, and then fills a radially outer portion of the pocket portion 57a, that is, a portion that molds the cylindrical portion 60. That is, since the cold slug is pushed toward the radially inner end portion of the pocket portion 57a, in other words, is guided in a direction away from the wheel tooth portion molding portion 49, the cold slug is easily held inside the pocket portion 57a in this process. Therefore, it is possible to more effectively prevent the cold slug from flowing to the wheel tooth portion molding portion 49.

Other configurations, operations, and effects are the same as those of the first embodiment.

Fourth Embodiment

Figure 15:
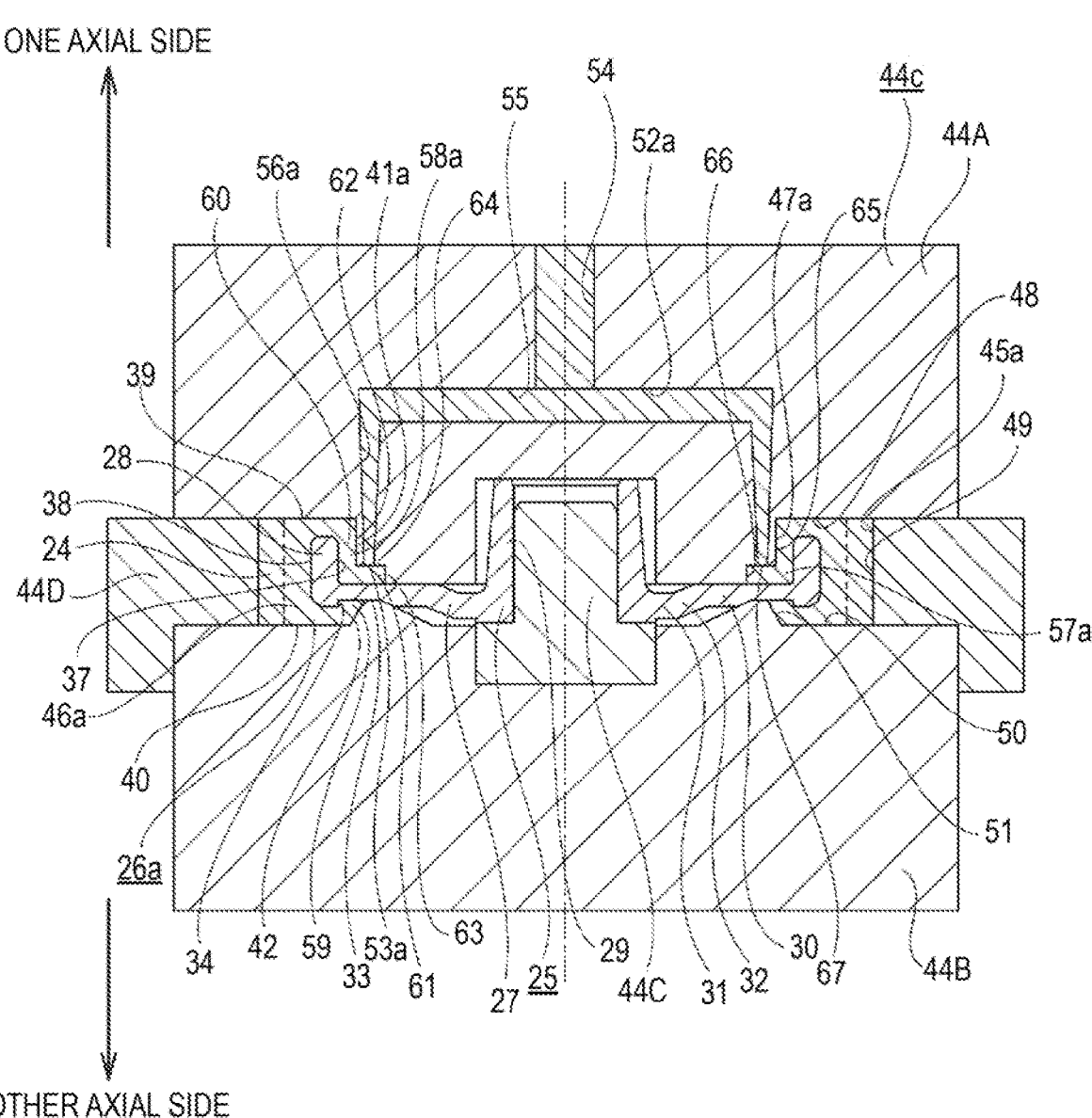
FIG. 15 is a view corresponding to FIG. 9 and showing a fourth embodiment of the present invention.

A fourth embodiment of the present invention will be described with reference to FIG. 15.

In this example, the injection gate 53a of a mold 44c is opened in a radially inner portion of the connection surface portion 67 constituting the inner surface 45a. Accordingly, the injection gate 53a is axially opposed to a radially outer portion of a side surface of the side plate portion 27 constituting the inner wheel element 25 on the one axial side. Further, when the outer wheel element 26a is injection molded, a molten resin is fed from the injection gate 53a toward the pocket portion 57a of the cavity 46a. In a case of the present example, since the molten resin fed from the injection gate 53a toward the pocket portion 57a of the cavity 46a also fills a radially inner portion of the pocket portion 57a, that is, a portion that molds the inward flange portion 61, and then fills a radially outer portion of the pocket portion 57a, that is, a portion that molds the cylindrical portion 60, a cold slug is easily held inside the pocket portion 57a in this process. Therefore, it is possible to more effectively prevent the cold slug from flowing to the wheel tooth portion molding portion 49. Other configurations, operations, and effects are the same as those of the first embodiment and the third embodiment.

Fifth Embodiment

Figure 16:
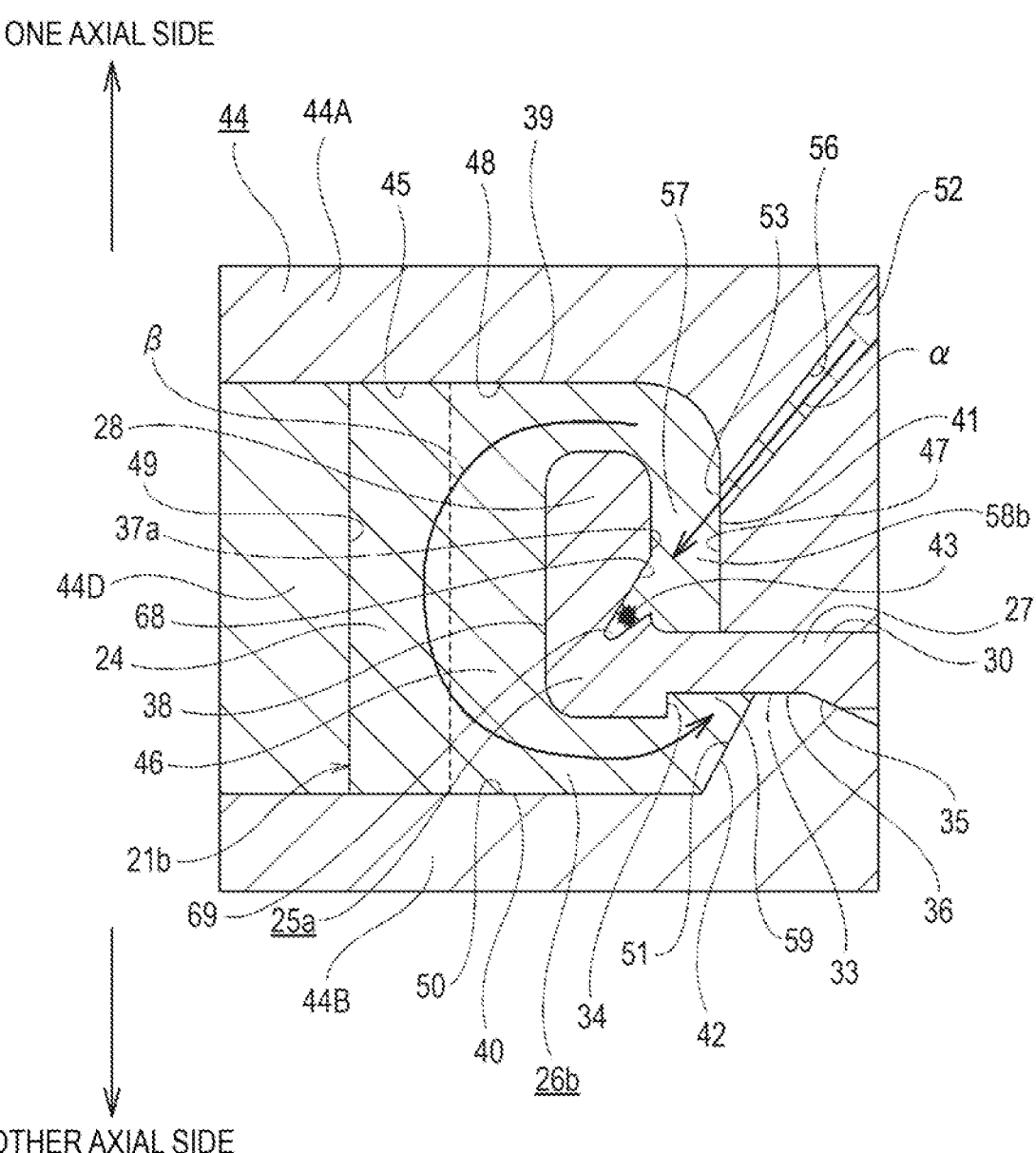
FIG. 16 is a view corresponding to FIG. 11 and showing a fifth embodiment of the present invention.

A fifth embodiment of the present invention will be described with reference to FIG. 16.

In the present example, an inner wheel element 25a constituting a worm wheel 21b to be manufactured includes an engagement groove 68 on the other axial side portion of an inner circumferential surface 37a of the eave portion 28. The engagement groove 68 is formed on the other axial side portion of the inner circumferential surface 37a in a manner of being recessed radially outward over an entire circumference. In the present example, the engagement groove 68 is inclined to the other axial side toward a radially outer side. Furthermore, in the present example, the engagement groove 68 has a V-shaped cross-sectional shape in which a width dimension in an axial direction decreases from an opening on an inner diameter side toward a bottom portion on an outer diameter side. In the worm wheel 21b including such an inner wheel element 25a, a part of the synthetic resin constituting a first restriction portion 58b of an outer wheel element 26b enters an inside of the engagement groove 68 and constitutes a moment direction holding portion 69 engaged with the engagement groove 68. Further, engagement between the engagement groove 68 and the moment direction holding portion 69 can improve a holding force of the outer wheel element 26b with respect to the inner wheel element 25a in a moment direction.

In the present example, when the outer wheel element 26b is injection molded, as shown in the figure, in a state in which an inclination direction of the third runner portion 56 coincides with an inclination direction of the engagement groove 68 and the injection gate 53 is opposed to the engagement groove 68, a molten resin is fed from the injection gate 53 toward the pocket portion 57 of the cavity 46 as indicated by an arrow α. Accordingly, by feeding the cold slug 43 flowing at a head of the molten resin into the engagement groove 68, the cold slug 43 is held in the engagement groove 68, that is, in the moment direction holding portion 69. Since an outer diameter of the cold slug 43 is about an opening width of the injection gate 53 at the maximum, in the present example, the cold slug 43 is easily fed into the engagement groove 68 by setting an opening width of the engagement groove 68 to be equal to or larger than the opening width of the injection gate 53.

Other configurations, operations, and effects are the same as those of the first embodiment.

Sixth Embodiment

A sixth embodiment of the present invention will be described with reference to FIGS. 17A and 17B.

Figure 17A:
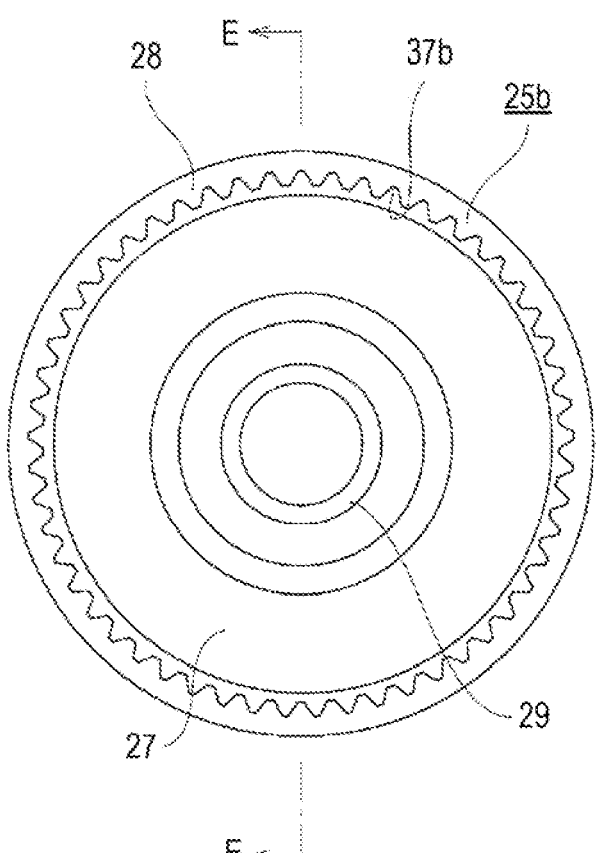
Figure 17B:
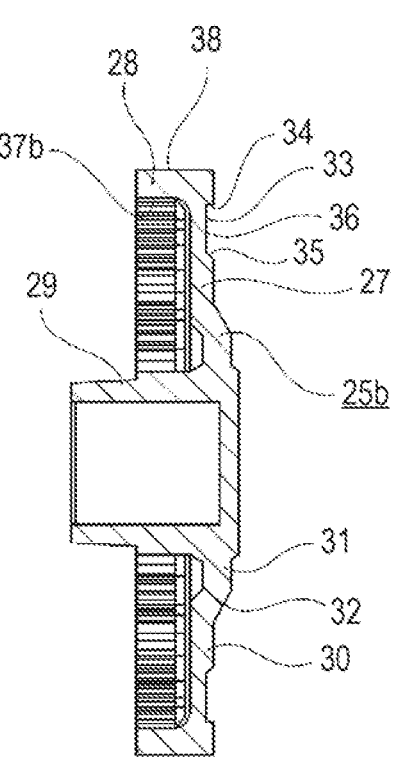

The present example is different from the first embodiment in that an inner wheel element 25b constituting a worm wheel to be manufactured is formed such that an inner circumferential surface 37b of the eave portion 28 is formed by a gear-shaped recess-projection portion as shown in FIGS. 17A and 17B.

In the worm wheel including such an inner wheel element 25b, a radially outer end portion of a first restriction portion constituting an outer wheel element can be provided with an engaging projection that enters into each of a plurality of recesses that form the inner circumferential surface 37b and engages with the recesses. Therefore, based on engagement between such a recess and the engaging projection, it is possible to improve a holding force of the outer wheel element with respect to the inner wheel element 25b in a rotation direction.

Such a recess-projection portion that increases the holding force in the rotation direction can also be provided on a position of a surface of the inner wheel element covered with the outer wheel element, other than the inner circumferential surface of the eave portion.

Other configurations, operations, and effects are the same as those of the first embodiment.

Seventh Embodiment

A seventh embodiment of the present invention will be described with reference to FIGS. 18 to 21.

Figure 18:
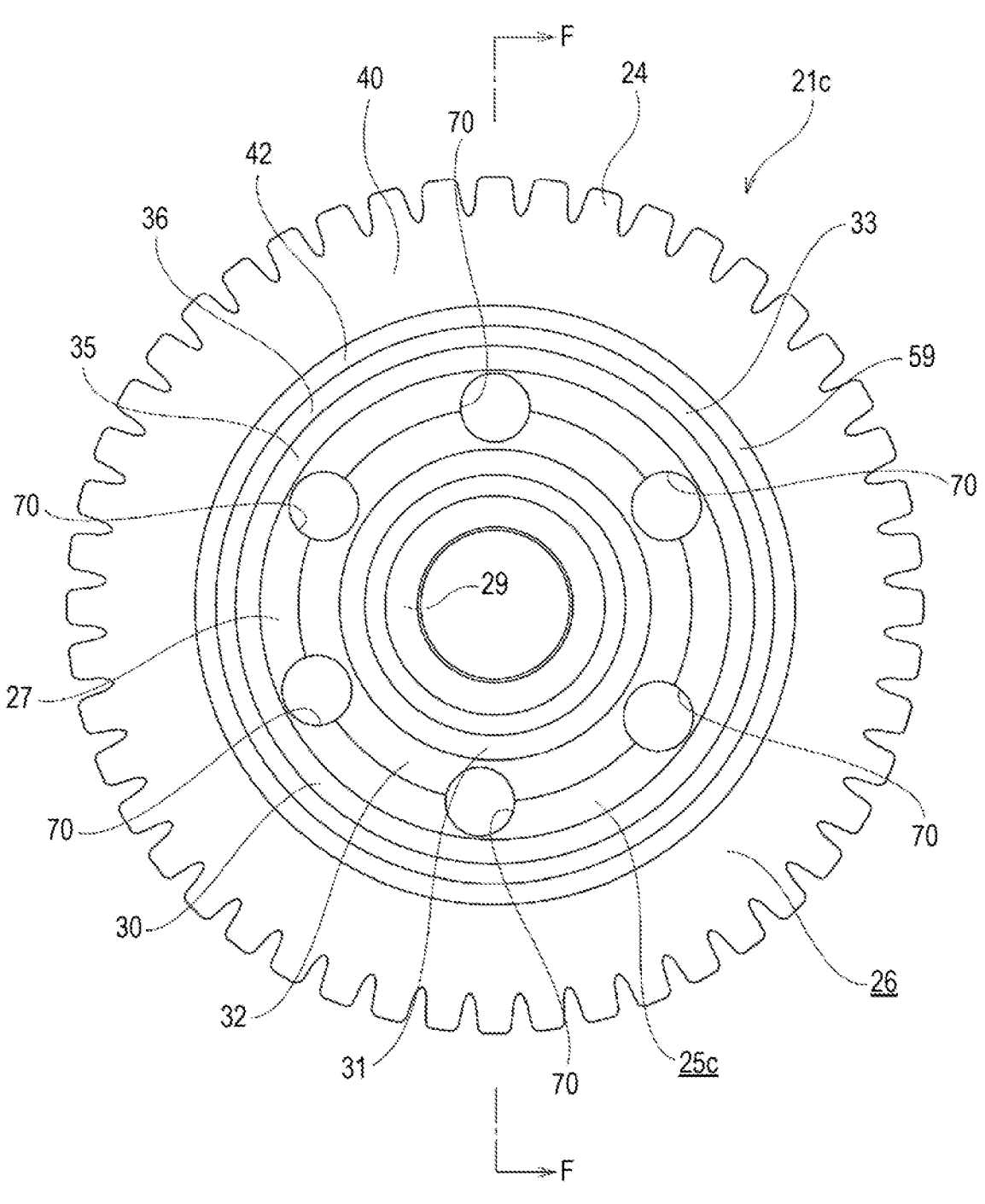
FIG. 18 is a view of a worm wheel according to a seventh embodiment as observed in the axial direction.
Figure 19:
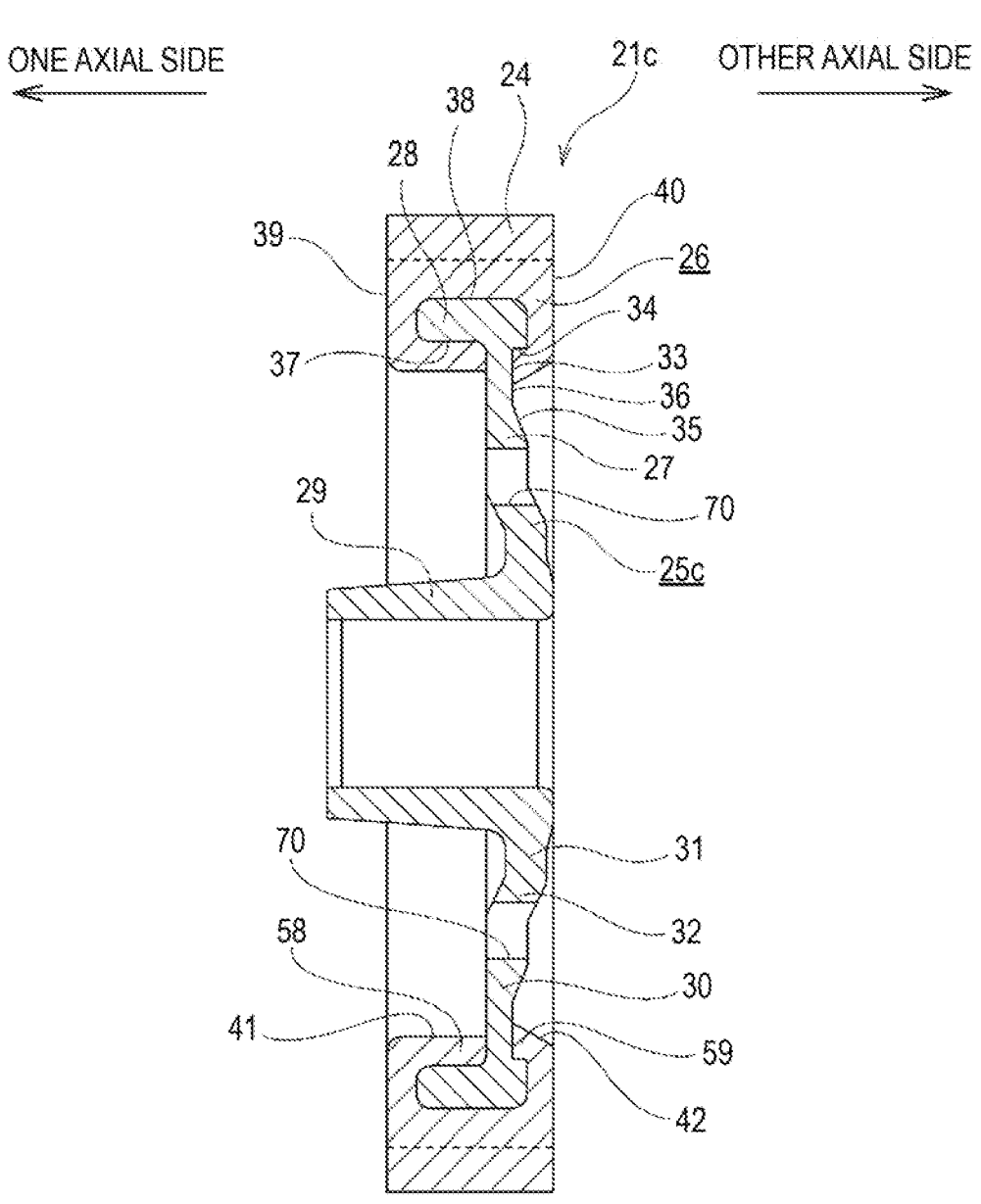
FIG. 19 is a cross-sectional view taken along a line F-F in FIG. 18.

As shown in FIGS. 18 and 19, the present example is different from the first embodiment in that an inner wheel element 25c constituting a worm wheel 21c to be manufactured includes through holes 70. That is, in the present example, the inner wheel element 25c includes the through holes 70 penetrating in an axial direction in a portion of the side plate portion 27 located radially inward of the outer wheel element 26. In the present example, specifically, the through holes 70 are provided at a plurality of circumferential positions (six positions at equal intervals in a circumferential direction in the shown figure) of a radially intermediate portion, which is a portion of the side plate portion 27 located radially inward of the outer wheel element 26, and have a circular shape when viewed in the axial direction. In such a structure of the present example, a weight of the inner wheel element 25c, that is, a weight of the worm wheel 21c can be reduced based on presence of the through holes 70. The number, disposed locations, shapes and sizes as viewed in the axial direction, and the like of through holes in a portion of the side plate portion 27 which is located radially inward of the outer wheel element 26 may be different from those in the present example. For example, the shapes of the through holes as viewed in the axial direction may be shapes extending in a circumferential direction of the inner wheel element.

In the method for manufacturing the worm wheel 21c of the present example, regardless of presence of the through holes 70, it is easy to ensure shape accuracy of the outer wheel element 26 formed by injection molding. Next, this point will be described in comparison with a comparative example shown in FIG. 21.

Figure 21:
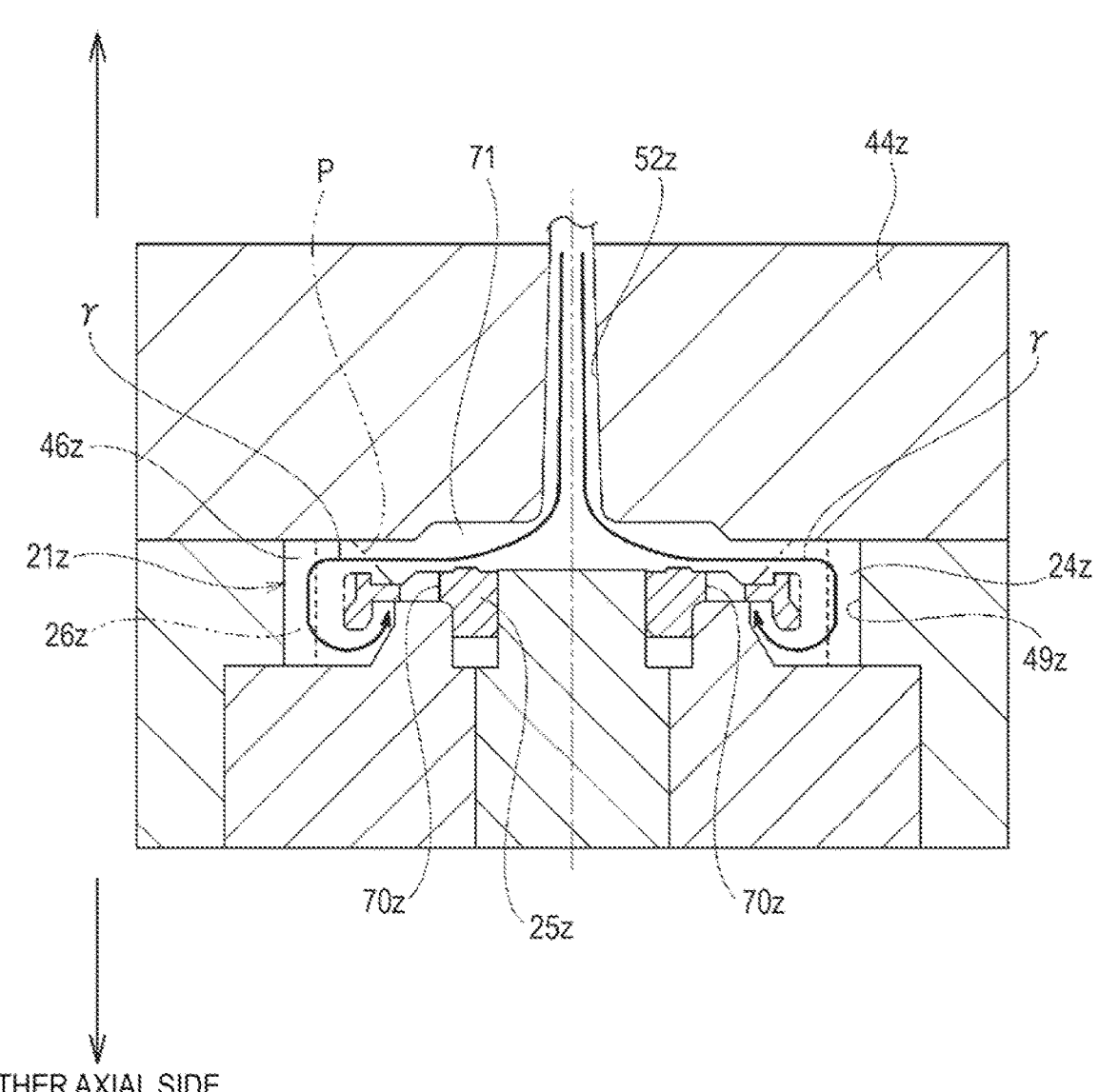
FIG. 21 is a view corresponding to FIG. 6 and showing a comparative example with respect to the seventh embodiment of the present invention.

A worm wheel 21z to be manufactured according to the comparative example shown in FIG. 21 also includes through holes 70z penetrating in an axial direction at a plurality of circumferential positions of a portion of an inner wheel element 25z located radially inward of an outer wheel element 26z.

A mold 44z that molds the outer wheel element 26z by injection molding includes a runner 52z and a disk gate 71 on the one axial side of the inner wheel element 25z. The runner 52z extends in the axial direction of the inner wheel element 25z and is disposed coaxially with the inner wheel element 25z. The disk gate 71 is a disk-shaped gate extending radially outward from an end portion on the other axial side, which is a downstream end portion of the runner 52z, and is disposed adjacent to the one axial side of the inner wheel element 25z. A radially outer end portion P, which is a downstream end portion of the disk gate 71, opens at a radially inner end portion of a one axial side portion of a cavity 46z, which is a molding space for the outer wheel element 26z.

In the comparative example, as indicated by a thick arrow γ in FIG. 21, a molten synthetic resin is fed into the cavity 46z through the runner 52z and the disk gate 71. Thereafter, the mold 44z is opened to take out the synthetic resin cooled and solidified in the runner 52z, the disk gate 71, and the cavity 46z. Further, the synthetic resin solidified in the runner 52z and the disk gate 71 and the synthetic resin solidified in the cavity 46z, that is, the outer wheel element 26z are separated at a portion corresponding to the downstream end portion P of the disk gate 71.

In a method for manufacturing the worm wheel 21z according to the comparative example as described above, the molten resin flowing inside the disk gate 71 from a radially inner side to a radially outer side flows into the through holes 70z in the middle at the circumferential position where the through holes 70z are present, fills insides of the through holes 70z, and then flows to the radially outer side, whereas the molten resin directly flows to the radially outer side at a circumferential position where the through holes 70z are not present. Therefore, timings at which the molten resin is fed from the disk gate 71 into the cavity 46z, that is, timings at which the molten resin is cooled and solidified in the cavity 46z tend to be different between the circumferential positions where the through holes 70z are present and the circumferential position where the through holes 70z are not present. As a result, shape accuracy of the entire outer wheel element 26z including a wheel tooth portion 24z may deteriorate.

Figure 20:
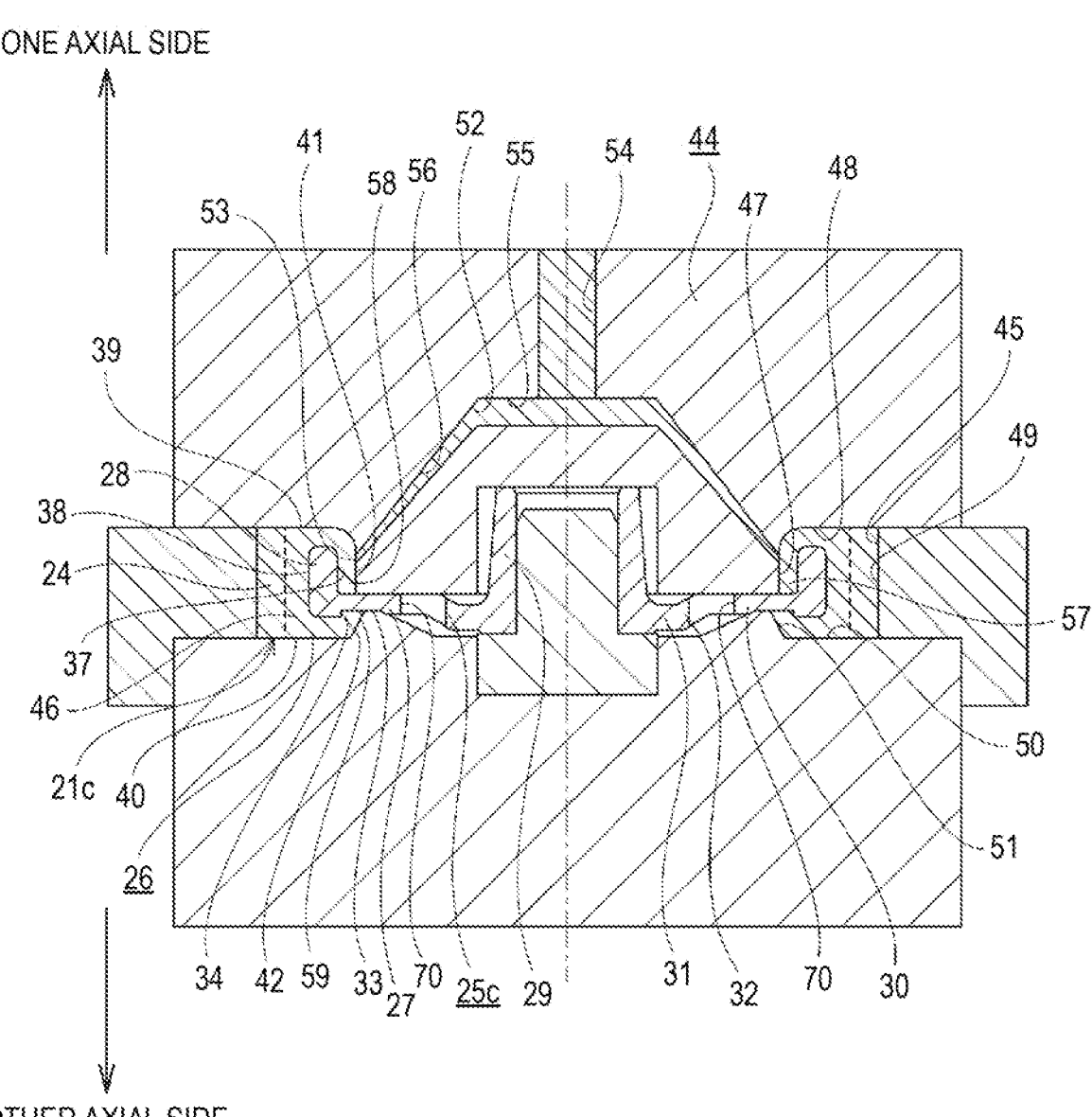
FIG. 20 is a view corresponding to FIG. 9 and showing the seventh embodiment of the present invention.

On the other hand, in a method for manufacturing the worm wheel 21c of the present example, as shown in FIG. 20, the outer wheel element 26 is injection molded in the same manner as in the case of the first embodiment. Further, at this time, the molten resin does not flow into the through holes 70 of the inner wheel element 25c. Therefore, as in the case of the first embodiment, after the molten resin is fed into the pocket portion 57 from the injection gate 53, the molten resin overflowing from an end portion of the pocket portion 57 on the one axial side flows inside the cavity 46 substantially simultaneously over an entire circumference as indicated by the arrow β in FIG. 11. Therefore, the cooling and the solidification of the molten resin in the cavity 46 can proceed substantially simultaneously over the entire circumference. Therefore, it is easy to ensure the shape accuracy of the entire outer wheel element 26 including the wheel tooth portion 24.

Other configurations, operations, and effects are the same as those of the first embodiment.

Seventh Embodiment

Figure 22:
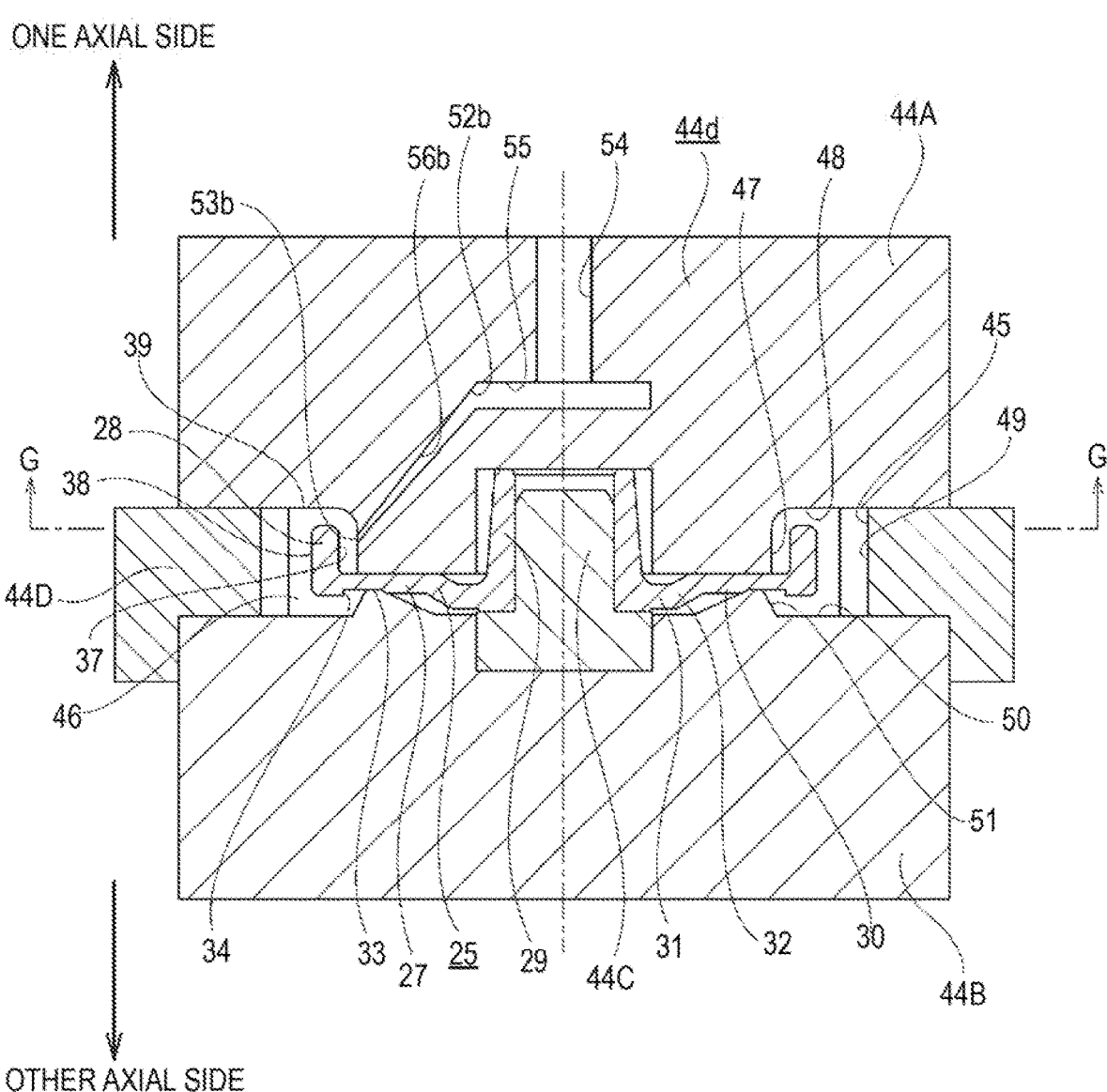
FIG. 22 is a view corresponding to FIG. 6 and showing an eighth embodiment of the present invention.
Figure 23:
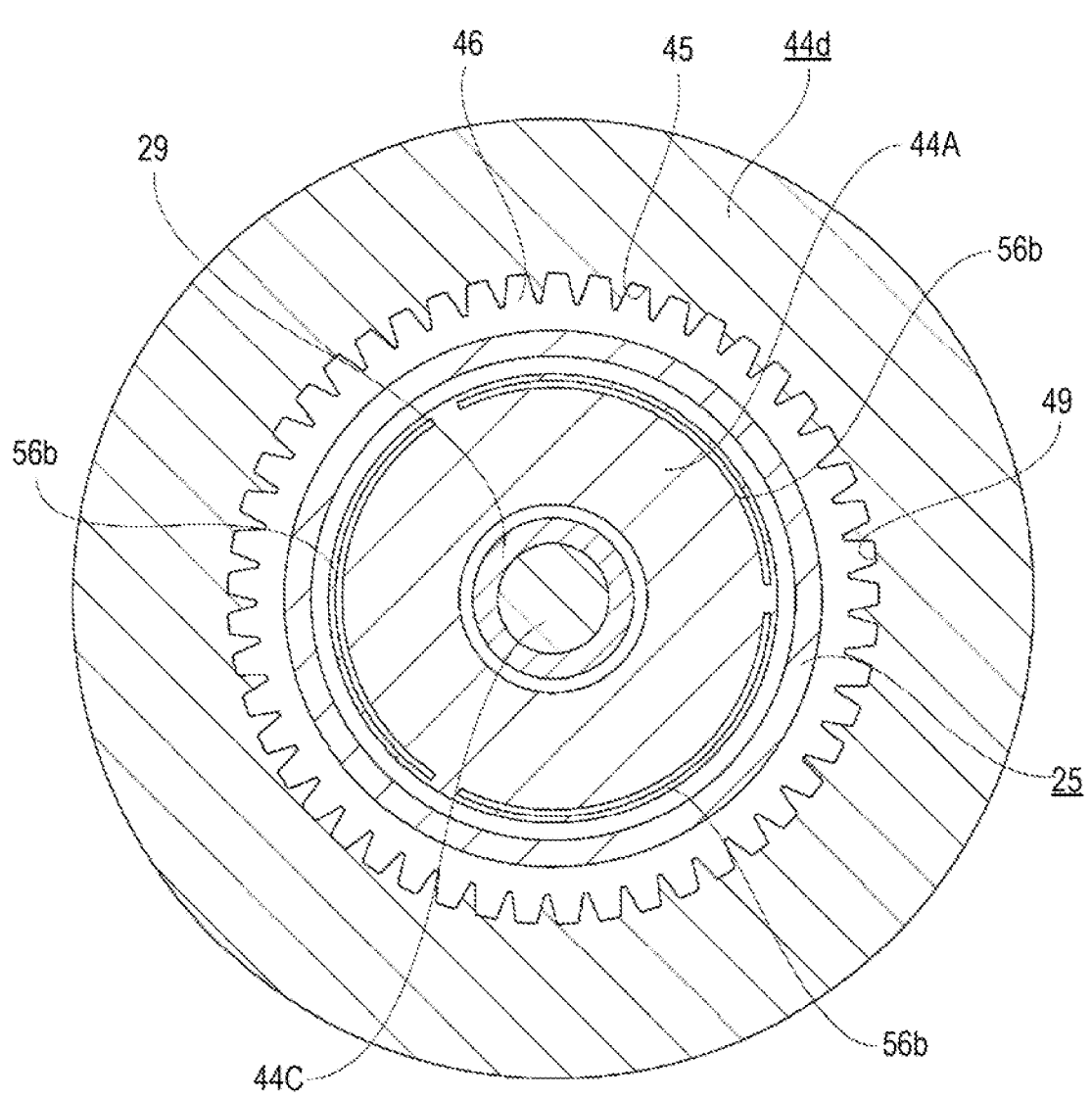
FIG. 23 is a cross-sectional view taken along a line G-G in FIG. 22.

A seventh embodiment of the present invention will be described with reference to FIGS. 22 and 23.

In a case of implementing the present invention, a shape of an injection gate is not limited to an annular shape as long as a flow of a molten resin at a time of injection molding is not impaired, and may be, for example, an arc shape disposed coaxially with a central axis of an inner wheel element, that is, an arc shape having the central axis of the inner wheel element as a center of a curvature. When the shape of the injection gate is an arc shape, it is also possible to adopt a configuration in which a plurality of arc-shaped injection gates are disposed in a manner of being separated from each other in a circumferential direction.

A mold 44*d* used in a method for manufacturing a worm wheel of the present example includes three third runner portions 56*b* constituting a runner 52*b*. The three third runner portions 56*b* are each formed in a partially conical cylindrical shape centered on the central axis of the inner wheel element 25, and are arranged at equal intervals in the circumferential direction. Accordingly, an injection gate 53*b* disposed at the downstream end portions of the third runner portions 56*b* are formed in an arc shape centered on the central axis of the inner wheel element 25, and are arranged at equal intervals in the circumferential direction.

Therefore, a plurality of arc-shaped injection gate marks are formed on a surface of the outer wheel element 26.

Other configurations, operations, and effects are the same as those of the first embodiment.

Eighth Embodiment

An eighth embodiment of the present invention will be described with reference to FIGS. 24 and 25.

Figure 24:
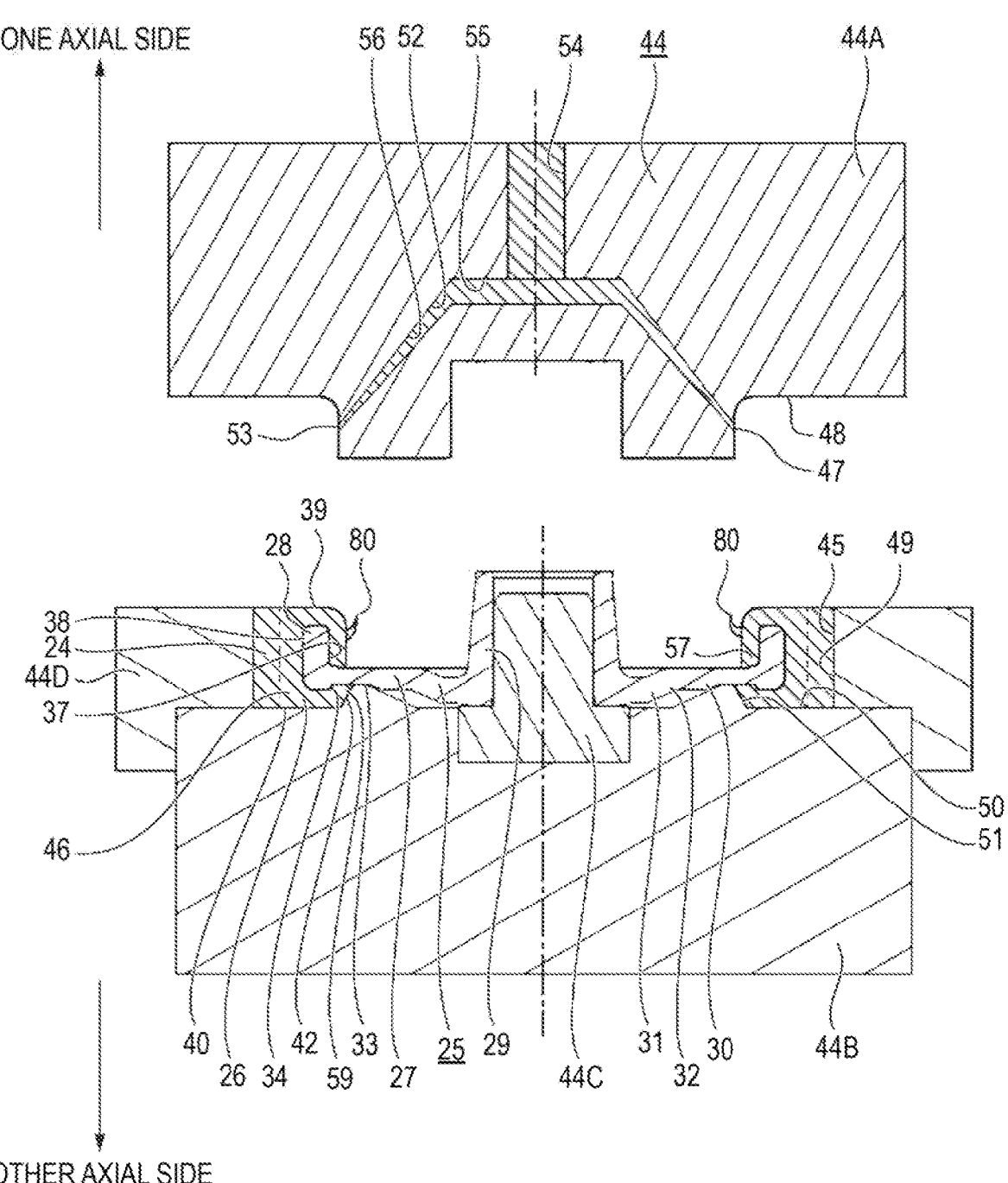
FIG. 24 is a cross-sectional view showing a state in which a first mold element of a mold is opened after an outer wheel element constituting a worm wheel is injection molded and showing a ninth embodiment of the present invention.

In the present example, as shown in FIG. 24, a synthetic resin cooled and solidified in the cavity 46, that is, the outer wheel element 26 is taken out from the cavity 46 by opening the mold 44, and at the same time, the outer wheel element 26 and the synthetic resin remaining inside the runner 52 and cooled and solidified in the runner 52 are separated from each other at a position of the injection gate 53. In the present example, a separated piece (burr) 80, which remains on the first inner circumferential surface 41 of the outer wheel element 26 and formed by tearing off the resin when the outer wheel element 26 and the synthetic resin are separated, remains on the first inner circumferential surface 41 without being removed in a finishing process, and a product is made.

Figure 25:
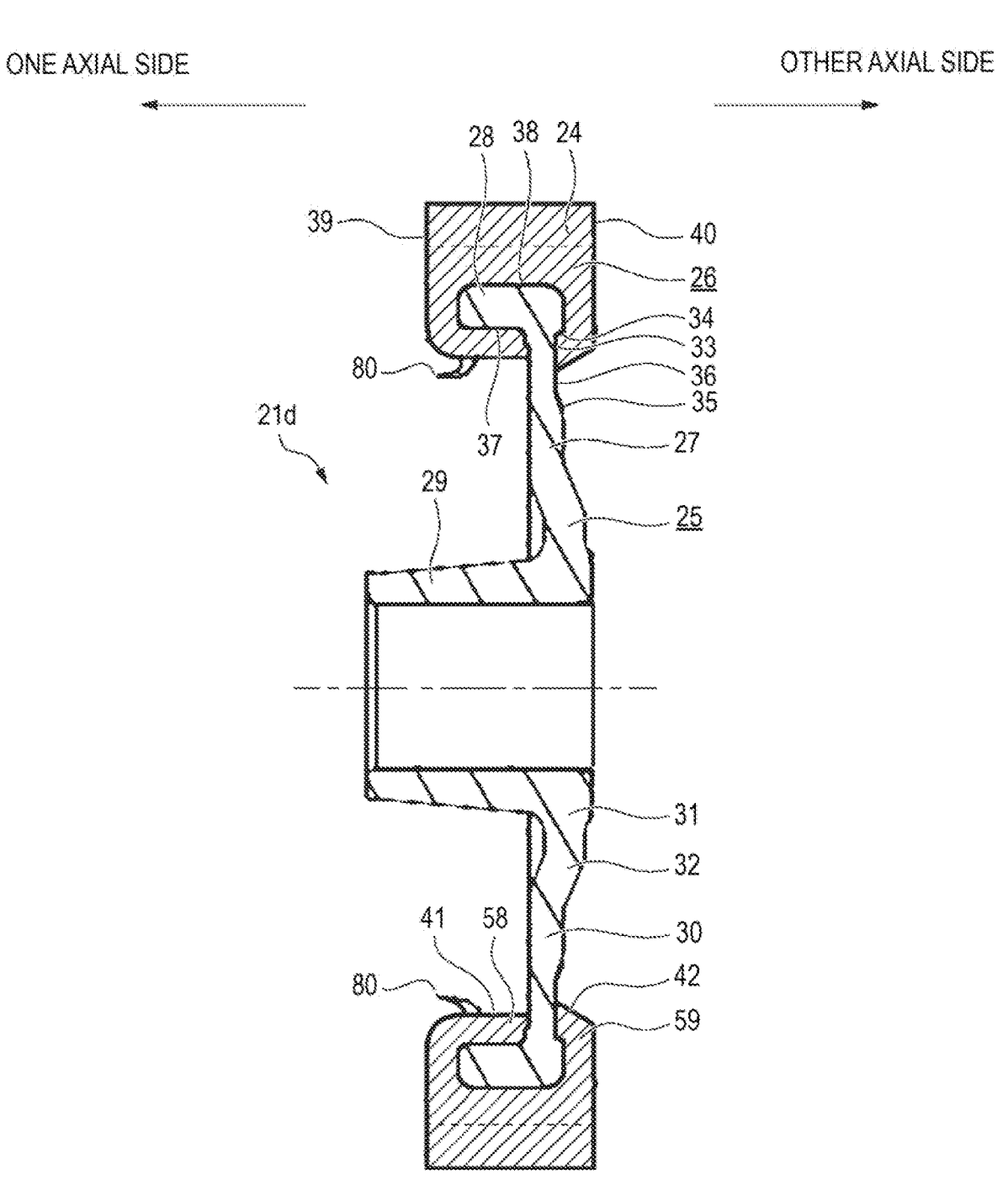
FIG. 25 is a cross-sectional view of the worm wheel according to the ninth embodiment of the present invention.
Figure 26:
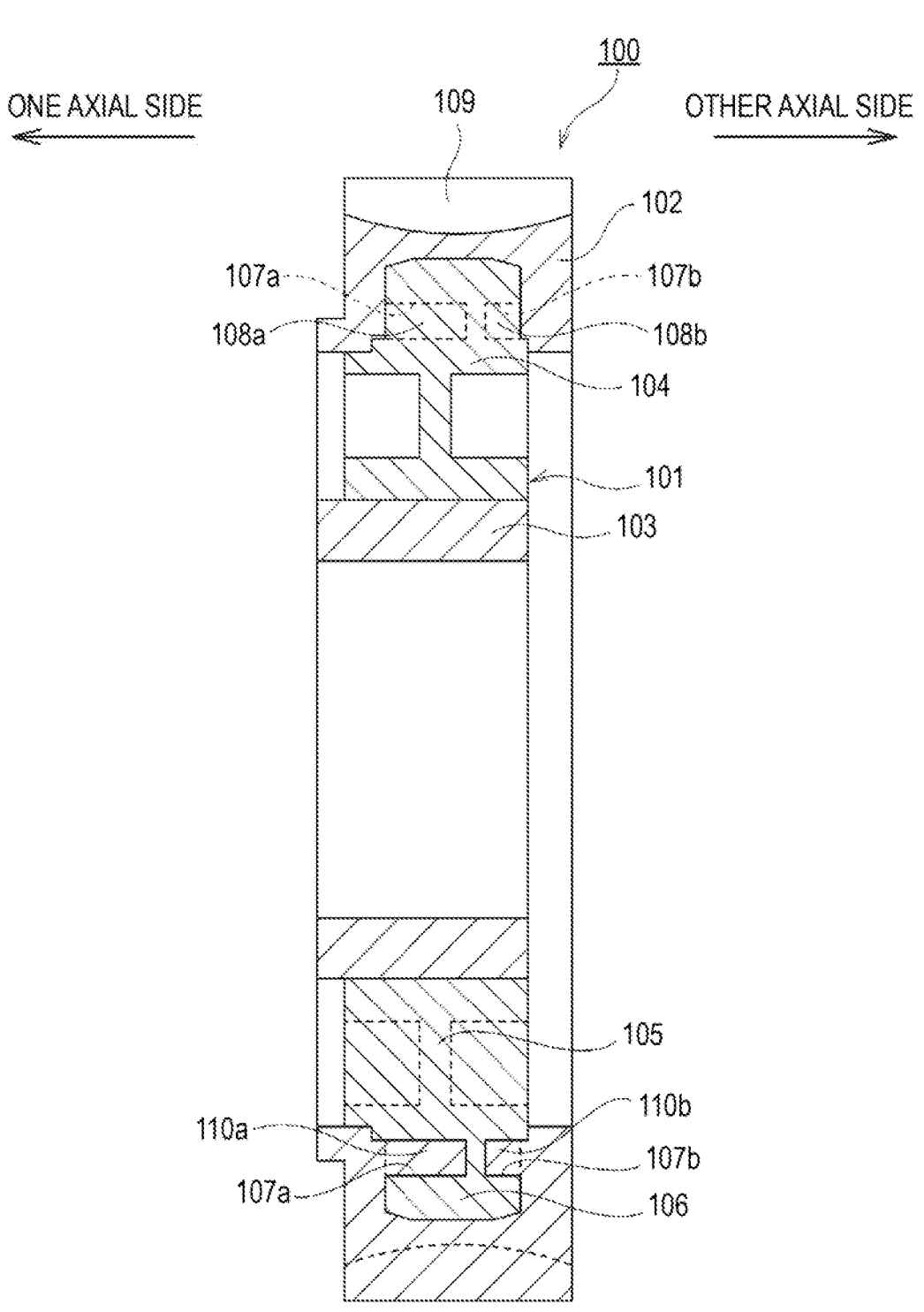
FIG. 26 is a cross-sectional view of a worm wheel in related art.
Figure 27:
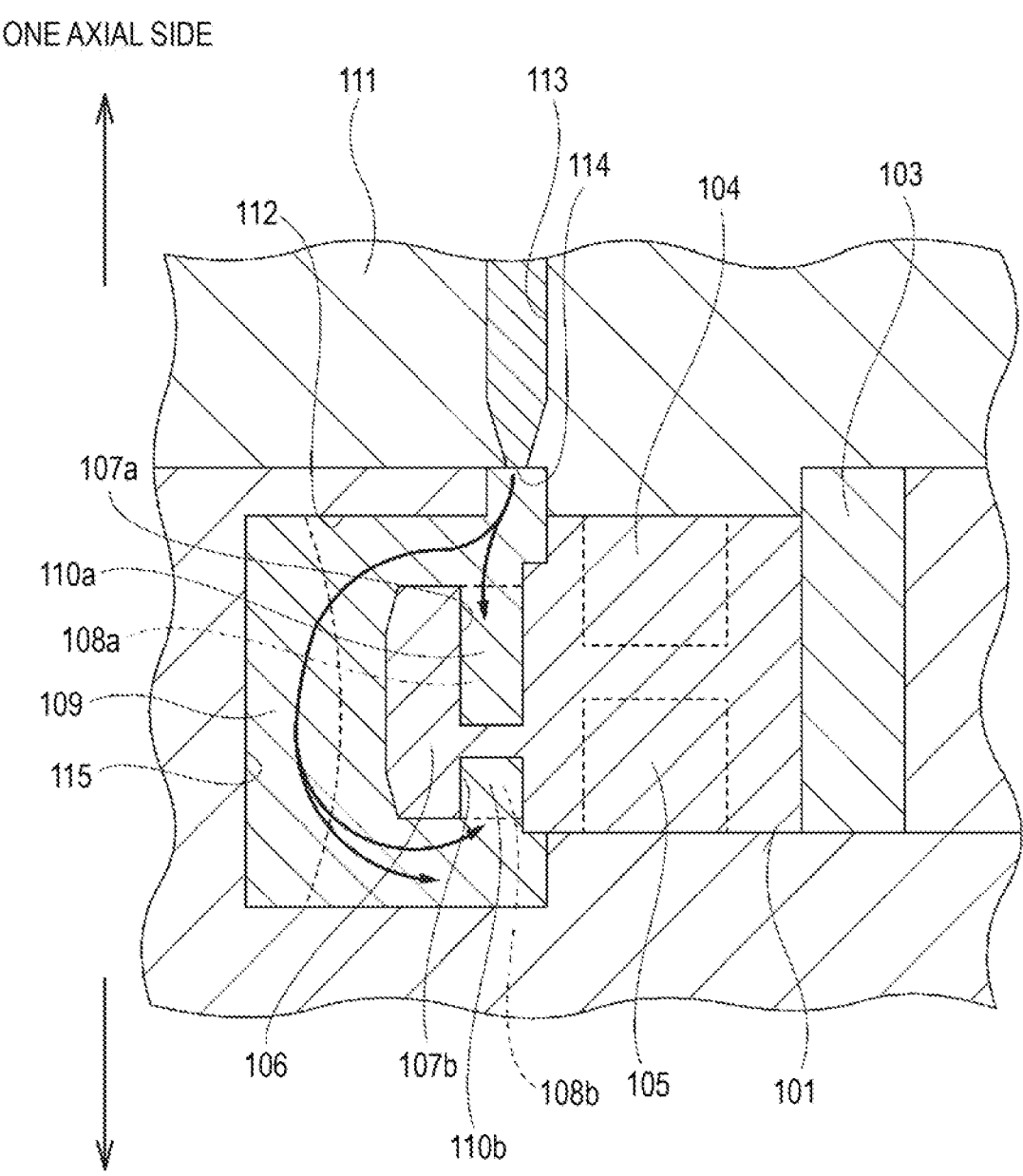
FIG. 27 is a partial cross-sectional view showing a step of injection molding an outer wheel element constituting the worm wheel in the related art.

Therefore, as shown in FIG. 25, a worm wheel 21*d* to be manufactured includes the separated piece 80 protruding from the first inner circumferential surface 41 to an inner diameter side at a position of an injection gate mark of the first inner circumferential surface 41 of the outer wheel element 26. In this case, it is possible to reduce a processing cost for cutting the separated piece 80. In FIGS. 24 and 25, the separated mark 80 is shown in a cross section, but is formed over a circumferential direction according to a shape of the injection gate 53.

Other configurations, operations, and effects are the same as those of the first embodiment.

Structures of the embodiments described above can be appropriately combined and implemented as long as the embodiments do not cause a contradiction.

A worm reduction gear including a worm wheel to be manufactured according to the present invention is not limited to a crack assist type electric power steering device, and may be incorporated into electric power steering devices having various structures such as a pinion assist type electric power steering device, a column assist type electric power steering device, and a dual-pinion type electric power steering device, and may be incorporated into a steer-by-wire type steering device.

REFERENCE SIGNS LIST

1: electric power steering device
2: steering wheel
3: steering shaft
4: steering column
5*a*, 5*b*: universal joint
6: intermediate shaft
7: steering gear unit
8: electric assist device
9: pinion shaft
10: rack shaft
11: housing
12: second rack tooth portion
13: pinion shaft
14: first bearing
15: second bearing
16: pressing block
17: spring
18: worm reduction gear
19: electric motor
20: pinion tooth portion
21, 21*a*, 21*b*, 21*c*, 21*z*: worm wheel
22: worm
23: worm tooth portion
24: wheel tooth portion
25, 25*a*, 25*b*, 25*c*, 25*z*: inner wheel element
26, 26*a*, 26*b*, 26*z*: outer wheel element
27: side plate portion
28: eave portion
29: fitting tube portion
30: radially outer side plate portion
31: radially inner side plate portion
32: intermediate side plate portion
33: annular recess
34: radially outer circumferential surface
35: radially inner circumferential surface
36: bottom surface
37, 37*a*, 37*b*: inner circumferential surface
38: outer circumferential surface
39: first side surface
40: second side surface
41, 41*a*: first inner circumferential surface
42: second inner circumferential surface
43: cold slug
44, 44*a*, 44*b*, 44*c*, 44*d*, 44*z*: mold
44A: first mold element
44B: second mold element
44C: third mold element
44D: fourth mold element
45, 45*a*: inner surface
46, 46*z*: cavity
47, 47*a*: first inner circumferential surface molding portion
48: first side surface molding portion
49: wheel tooth portion molding portion
50: second side surface molding portion
51: second inner circumferential surface molding portion
52, 52*a*, 52*b*, 52*z*: runner
53, 53*a*, 53*b*: injection gate

54: first runner portion
55: second runner portion
56, 56*a*, 56*b*: third runner portion
57, 57*a*: pocket portion
58, 58*a*, 58*b*: first restriction portion
59: second restriction portion
60: cylindrical portion
61: inward flange portion
62: large diameter inner circumferential surface
63: small diameter inner circumferential surface
64: connection surface
65: large diameter surface portion
66: small diameter surface portion
67: connection surface portion
68: engagement groove
69: moment direction holding portion
70: through hole
71: disk gate
80: separated piece
100: worm wheel
101: inner wheel element
102: outer wheel element
103: metal portion
104: resin portion
105: radially inner portion
106: radially outer portion
107*a*: first recess
107*b*: second recess
108*a*: first reinforcing rib
108*b*: second reinforcing rib
109: wheel tooth portion
110*a*: first engagement portion
110*b*: second engagement portion
111: mold
112: cavity
113: runner
114: injection gate
115: wheel tooth portion molding portion

The invention claimed is:

1. A method for manufacturing a worm wheel including an inner wheel element including a side plate portion having a hollow circular plate shape and a tubular eave portion extending from a radially outer end portion of the side plate portion toward one axial side, and an outer wheel element made of a synthetic resin, including a wheel tooth portion on an outer circumferential surface thereof, and coupled and fixed to the inner wheel element in a manner of covering a radially outer portion of the side plate portion and the eave portion, the method comprising:

molding the outer wheel element by disposing a mold around a radially outer portion of the inner wheel element, and feeding, at an angle, the molten synthetic resin from an annular or arc-shaped injection gate toward a pocket portion that is continuous over an entire circumference of a cavity present between an inner surface of the mold and a surface of the inner wheel element and that is present on a radially inner side of the eave portion, wherein the angle is an acute angle between a runner portion of the injection gate and the side plate portion, the molten synthetic resin being fed to the injection gate through the runner portion.

2. The method for manufacturing the worm wheel according to claim 1, wherein
the injection gate faces an inner circumferential surface of the eave portion.

3. The method for manufacturing the worm wheel according to claim 2, wherein:

the inner wheel element includes an engagement groove recessed radially outward over an entire circumference of the inner circumferential surface of the eave portion; and
the injection gate faces the engagement groove in the inner circumferential surface of the eave portion.

4. The method for manufacturing the worm wheel according to claim 1, wherein
the injection gate faces a side surface of the side plate portion on the one axial side.

5. The method for manufacturing the worm wheel according to claim 4, wherein
the mold includes a stepped cylindrical surface portion including a large diameter surface portion facing an inner circumferential surface of an one axial side portion of the eave portion, a small diameter surface portion facing an inner circumferential surface of the other axial side portion of the eave portion, and a connection surface portion connecting the large diameter surface portion and the small diameter surface portion.

6. The method for manufacturing the worm wheel according to claim 5, wherein
the injection gate is opened to the connection surface portion.

7. The method for manufacturing the worm wheel according to claim 5, wherein:
the mold includes a side surface molding portion bent radially outward from an end portion of the large diameter surface portion on the one axial side; and
the injection gate is opened to the side surface molding portion.

8. The method for manufacturing the worm wheel according to claim 1, wherein
the inner wheel element includes a through hole penetrating in an axial direction in a portion of the side plate portion located radially inward of the outer wheel element.

9. The method for manufacturing the worm wheel according to claim 1, wherein:
the mold includes a hot runner including the injection gate at a downstream end portion; and
the injection gate is an open gate.

10. The method for manufacturing the worm wheel according to claim 1, wherein
when the mold is opened after the molding of the outer wheel element, a separated piece remaining on a side of the outer wheel element and formed by a part of the synthetic resin that remains inside a runner and is cooled and solidified, remains at a position where the injection gate of the outer wheel element is opened without being processed.

11. The method for manufacturing the worm wheel according to claim 1,
wherein the runner portion faces, through the injection gate, an engagement groove that is extended along the angle and into the eave portion.

12. The method for manufacturing the worm wheel according to claim 1, wherein, in a first direction, the eave portion is extended from the side plate portion towards a first side surface of the mold, the first side surface of the mold being at least partly perpendicular to the inner surface of the mold and parallel to an end surface of the eave portion, the end surface of the eave portion being a furthest portion of the eave portion away from the side plate portion, and
wherein the injection gate is arranged on the inner surface of the mold, between the first side surface of the mold and the side plate portion, and with the runner portion of the injection gate at the acute angle through which the molten synthetic resin is fed through the injection gate and toward the pocket portion such that during molding of the outer wheel element the molten synthetic resin is:

first filled into the cavity along a second direction, opposite to the first direction, until filling, from the injection gate, a portion of the mold between the eave portion and the inner surface of the mold in the second direction, and by first filling the portion of the mold in the second direction, then overflowing, in the first direction, from the portion such that:

a remainder area, in the first direction from the injection gate and between the eave portion and the inner surface, is then filled with the molten resin, and by overflowing the remainder area, then passes between the end surface of the eave portion, which is the furthest portion of the eave portion away from the side plate portion resin, and the first side surface of the mold.

13. The method for manufacturing the worm wheel according to claim 12, wherein the runner portion faces, through the injection gate, an engagement groove that is extended along the angle and into the eave portion.

14. The method for manufacturing the worm wheel according to claim 12, wherein during first filling the portion of the mold between the eave portion and the inner surface of the mold in the second direction, both the engagement groove, that is extended along the angle and into the eave portion, and the portion of the mold between the eave portion and the inner surface of the mold are filled before the molten synthetic resin overflows, in the first direction, from the portion and to the remainder area and then between the end surface of the eave portion, and the first side surface of the mold.

* * * * *